(12) United States Patent
Aberdeen et al.

(10) Patent No.: US 8,700,545 B2
(45) Date of Patent: Apr. 15, 2014

(54) SORTED INBOX WITH IMPORTANT MESSAGE IDENTIFICATION BASED ON GLOBAL AND USER MODELS

(75) Inventors: Douglas Aberdeen, Adliswil (CH);
David S. de Kloet, Zurich (CH);
Tadeusz Pietraszek, Rueschlikon (CH);
Annie Chen, Rueschlikon (CH)

(73) Assignee: Google Inc., Mountain View, CA (US)

( * ) Notice: Subject to any disclaimer, the term of this patent is extended or adjusted under 35 U.S.C. 154(b) by 285 days.

(21) Appl. No.: 13/219,646

(22) Filed: Aug. 27, 2011

(65) Prior Publication Data

US 2012/0054132 A1 Mar. 1, 2012

Related U.S. Application Data

(60) Provisional application No. 61/377,785, filed on Aug. 27, 2010, provisional application No. 61/337,793, filed on Aug. 27, 2010.

(51) Int. Cl.
*G06F 15/16* (2006.01)
*G06F 15/18* (2006.01)

(52) U.S. Cl.
USPC .......................................... 706/12; 709/206

(58) Field of Classification Search
None
See application file for complete search history.

(56) References Cited

U.S. PATENT DOCUMENTS

| | | | |
|---|---|---|---|
| 5,694,616 A | 12/1997 | Johnson et al. | |
| 6,351,764 B1 | 2/2002 | Voticky et al. | |
| 6,647,409 B1 | 11/2003 | Sherman et al. | |
| 7,181,495 B2 | 2/2007 | Skladman et al. | |
| 7,509,381 B1 * | 3/2009 | Hutchinson et al. | 709/206 |
| 7,890,596 B2 * | 2/2011 | Guy | 709/207 |
| 8,095,613 B1 * | 1/2012 | Perkowitz et al. | 709/207 |
| 2003/0195937 A1 * | 10/2003 | Kircher et al. | 709/207 |
| 2004/0220834 A1 * | 11/2004 | Pellinat | 705/2 |
| 2005/0044500 A1 | 2/2005 | Orimoto et al. | |
| 2005/0267944 A1 * | 12/2005 | Little, II | 709/207 |

(Continued)

FOREIGN PATENT DOCUMENTS

| | | |
|---|---|---|
| EP | 1603066 A1 | 12/2005 |
| WO | WO 01/09753 A2 | 2/2001 |

OTHER PUBLICATIONS

International Search Report and Written Opinion, PCT/US2011/049578, Dec. 20, 2011, 10 pages.

(Continued)

*Primary Examiner* — Jeffrey A Gaffin
*Assistant Examiner* — Dave Misir
(74) *Attorney, Agent, or Firm* — Morgan, Lewis & Bockius LLP

(57) ABSTRACT

A server system receives a message associated with a user. The server extracts message signals from the message, the extracted message signals including a first plurality of message signals. The server generates an importance weight for each message signal of the first plurality of message signals using both a global importance prediction model and a user importance prediction model. The global importance prediction model is based on information associated with multiple users, and the user importance prediction model is based on information associated with the user. The server determines an importance score for the message based on the generated importance weights of the first plurality of message signals. The server sends message information for the message along with information regarding importance of the message for display at a client device, where the information regarding importance of the message is based at least on the determined importance score.

22 Claims, 17 Drawing Sheets

(56) References Cited

U.S. PATENT DOCUMENTS

| | | | |
|---|---|---|---|
| 2006/0010217 A1* | 1/2006 | Sood | 709/206 |
| 2006/0031782 A1 | 2/2006 | Houmura et al. | |
| 2006/0041583 A1* | 2/2006 | Horvitz | 707/102 |
| 2006/0235933 A1* | 10/2006 | Baluja et al. | 709/207 |
| 2007/0254723 A1 | 11/2007 | Chu et al. | |
| 2008/0028031 A1 | 1/2008 | Bailey et al. | |
| 2008/0162642 A1 | 7/2008 | Bachiri et al. | |
| 2008/0195707 A1 | 8/2008 | May et al. | |
| 2008/0195717 A1 | 8/2008 | Brown | |
| 2009/0144655 A1 | 6/2009 | Hardy et al. | |
| 2009/0210507 A1* | 8/2009 | Haverkos | 709/206 |
| 2009/0254498 A1* | 10/2009 | Gupta et al. | 706/12 |
| 2010/0042570 A1* | 2/2010 | Mayers et al. | 706/46 |
| 2010/0153500 A1 | 6/2010 | O'Sullivan et al. | |
| 2010/0197355 A1 | 8/2010 | Irie et al. | |
| 2010/0211641 A1* | 8/2010 | Yih et al. | 709/206 |
| 2010/0251362 A1* | 9/2010 | Gillum et al. | 726/22 |
| 2010/0281397 A1* | 11/2010 | Buchheit et al. | 715/752 |
| 2010/0281409 A1 | 11/2010 | Rainisto et al. | |
| 2011/0119258 A1* | 5/2011 | Forutanpour et al. | 707/723 |

OTHER PUBLICATIONS

International Search Report and Written Opinion, PCT/US11/49580, Jan. 5, 2012, 9 pages.

Google Inc., International Preliminary Report on Patentability, PCT/US2011/049578, Mar. 14, 2013, 9 pgs.

Google Inc., International Preliminary Report on Patentability, PCT/US2011/049580, Mar. 14, 2013, 8 pgs.

Google Inc., International Preliminary Report on Patentability, PCT/US2011/064020, Mar. 4, 2013, 25 pgs.

Google Inc., International Search Report and Written Opinion, PCT/US2011/064020, Feb. 3, 2012, 9 pgs.

* cited by examiner

SORTED INBOX WITH IMPORTANT MESSAGE IDENTIFICATION BASED ON GLOBAL AND USER MODELS

RELATED APPLICATIONS

This application claims priority to Provisional Patent Application Ser. No. 61/377,785, filed Aug. 27, 2010, which is hereby incorporated by reference in its entirety.

This application is related to U.S. patent application Ser. No. 13/219,653, filed Aug. 27, 2011, "Sorted Inbox User Interface for Messaging Application," and Provisional Patent Application Ser. No. 61/377,793, filed Aug. 27 2010, both of which are hereby incorporated by reference in their entireties.

TECHNICAL FIELD

The disclosed embodiments relate generally to displaying messages, such as email, instant, and voicemail messages.

BACKGROUND

As the popularity of email communication has grown, so too has the number of email messages received and stored in user accounts. A user account typically includes all the messages sent to and from a respective email address or user name, excluding messages deleted from the account. However, some user accounts may be associated with a plurality of email addresses or user names, sometimes called aliases, which together may be considered to be a single logical email address or user name. The amount of received email can quickly overwhelm users—making it difficult to sift important messages from unimportant ones.

Additionally, many people now access and view their email on mobile devices, such as handheld computers or cell phones. Such mobile devices typically have small screens with even smaller message windows or interfaces for viewing messages. These interfaces often allow the user to view only a small number of messages at any given time, thereby requiring the user to interact more frequently with the interface to locate important messages, such as through scrolling through the messages. Such mobile devices may also employ network connectivity, which is sometimes charged by usage and is often slow. Users of these devices might wish to limit the messages they view to those of high importance when accessing message through this medium.

To deal with these problems, some message interfaces allow users to organize messages into folders or to apply user-defined labels to messages for easier identification. Additionally, in some email applications, users may order messages in a particular view in accordance with the value of single user-selected message header field, such as message delivery date, sender, or message title. However, these organizational techniques often fail to identify the messages that are most important to the user, leaving the user to scroll through many messages before locating the messages that he or she considers to be most important.

SUMMARY OF DISCLOSED EMBODIMENTS

In a server system having one or more processors and memory, and in a method performed by a server system having one or more processors and memory, the server system receives a message associated with a user and extracts message signals from the message. The extracted message signals include a first plurality of message signals. The server generates an importance weight for each message signal of the first plurality of message signals by determining a first weight for the respective message signal using a first importance prediction model, determining a second weight for the respective message signal using a second importance prediction model, and determining the importance weight of the respective message signal by combining the first weight and the second weight. The first importance prediction model is based on information associated with multiple users. The second importance prediction model is based on information associated with the user. The server determines an importance score for the message based on the generated importance weights of the first plurality of message signals. The server sends the message, along with information regarding importance of the message, to the user for display at a client device. The information regarding importance of the message is based at least on the determined importance score of the message.

In some embodiments, the extracted message signals include the first plurality of message signals and a second plurality of message signals. The server generates an importance weight for each message signal of the second plurality of message signals using the second importance prediction model, but not the first importance prediction model. The server determines the importance score for the message based on the generated importance weights of the first plurality of message signals and the generated importance weights of the second plurality of message signals.

In some embodiments, the server compares the importance score of the message with a threshold to determine importance of the message. In some embodiments, the server periodically updates the threshold using machine learning.

In some embodiments, the server automatically generates the importance weights for both the first and second importance prediction model without requiring the user to provide feedback data regarding importance of any message. Optionally, the server collects feedback data from the user regarding importance of one or more messages, and modifies the second importance prediction model using the feedback data. Optionally, the server periodically updates one or more of the importance weights in the first and second importance prediction models using machine-learning. Optionally, the server updates one or more of the importance weights in the first and second importance prediction models using a time-dependent decay function.

In some embodiments, the first and second importance prediction models both include a plurality of term-related weights, each for a distinct term-related message signal corresponding to presence or quantity of important terms in the message. Important terms include terms determined to be indicative of message importance.

In some embodiments, the message includes information identifying a set of message participants. The user has an associated social graph having a set of social graph members. The first and second importance prediction models both include a plurality of social graph-related weights, each concerning at least one of: presence of social graph members in the message participants, interactions of one or more social graph members with the message, interactions of one or more social graph members with information having a predefined relationship to the message.

At a client device with a display and in a method for displaying messages at the client device, the client device concurrently displays message information associated with a respective user by displaying first message information representing a first set of messages in a first area of the display, and displaying second message information representing a second set of messages in a second area of the display that is separate from the first area, where the first set of messages meet predefined message importance criteria, and each message in the first set of messages is excluded from the second set of messages.

In some embodiments, the displayed message information includes messages from a message account of the respective user. In some embodiments, the first message information is a first list of conversations, each conversation in the first list having at least one message meeting the predefined message importance criteria. Optionally, each conversation in the first list has at least one message that is unread by the user. Optionally, each of the second set of messages has been labeled with a predefined label by the user.

In some embodiments, the first message information is displayed in chronological order in the first area and the second message information is displayed in chronological order in the second area.

In some embodiments, the client device further concurrently displays a third set of messages in a third area that is separate from the first area and second area, wherein the first set of messages and second set of messages are excluded from the third set of messages.

In some embodiments, the client device further displays a respective expansion affordance in each of the first and second areas, and in response to user selection of the respective expansion affordance, expands the corresponding area and displays only the set of messages corresponding to the expanded area.

In some embodiments, each item represented by the first message information includes a predefined label to denote importance of the corresponding item, wherein each item represented by the first message information is a message or a conversation having one or more messages.

In some embodiments, the client device further displays a selectable importance marking affordance. In response to user selection of one or more items represented by the second message information and user selection of the selectable importance marking affordance, the client device marks the user selected items as important using the predefined label and moves the user selected items from one respective area of the display to another respective area of the display.

BRIEF DESCRIPTION OF THE DRAWINGS

Various embodiments of the invention are disclosed in the following Description of Embodiments herein, in conjunction with the following drawings in which like reference numerals refer to corresponding parts throughout the figures.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the described embodiments. However, some embodiments may be practiced without these specific details. In other instances, well-known methods, procedures, components, and circuits have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, so long as all occurrences of the first contact are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Figure 1A:
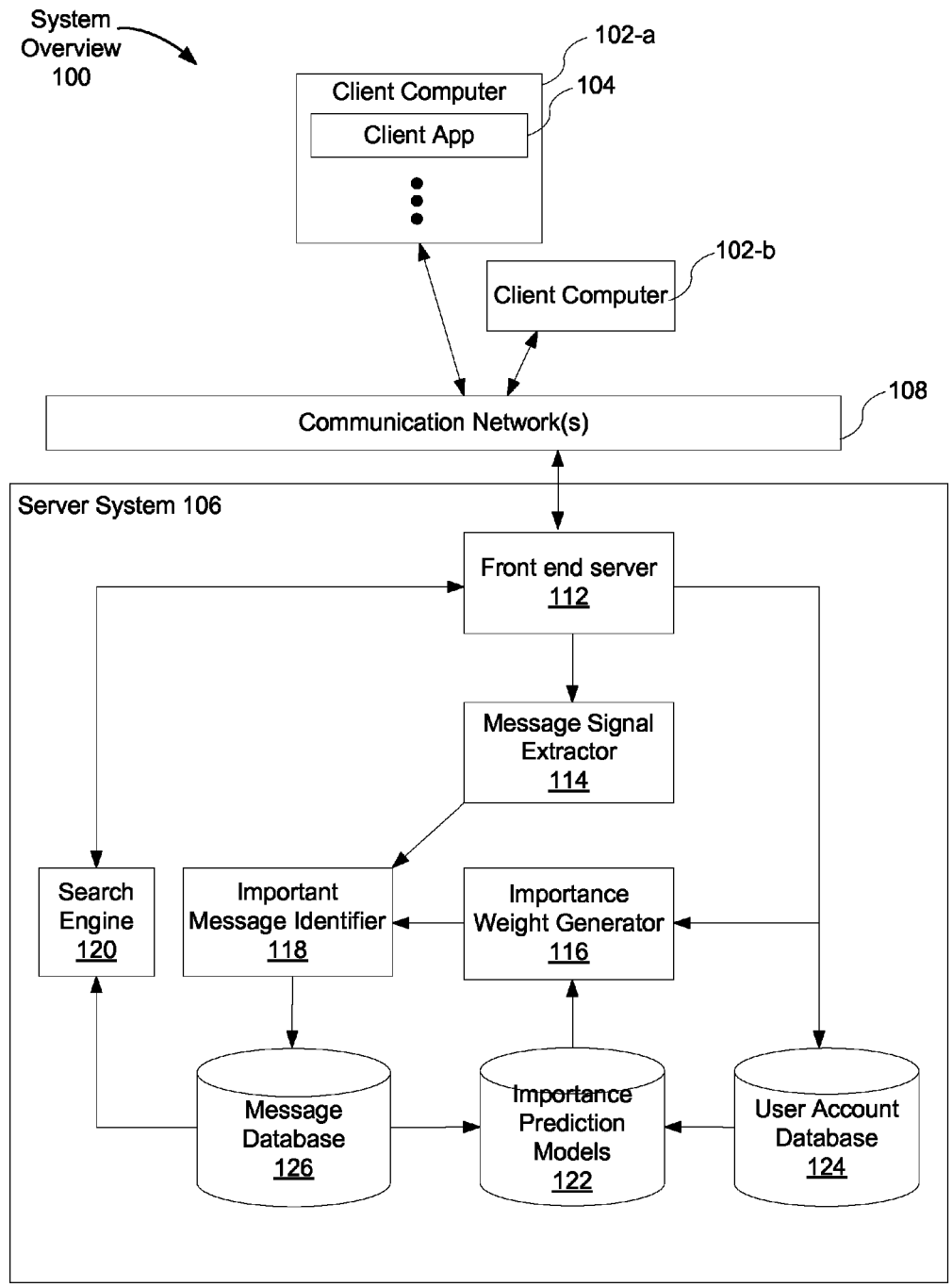
FIG. 1A is a block diagram illustrating an overview of a distributed client-server system according to some embodiments.

FIG. 1A is a block diagram of a distributed computer system 100 including client systems 102 and a server system 106 according to some embodiments. The server system 106 is connected to client computers 102 through one or more communication networks 108.

Client computer 102 (sometimes called a "client system," or "client device" or "client") may be any computer or device through which a user of the client computer 102 can submit service requests to and receive messaging services or other services from the server system 106. Examples of client computers 102 include, without limitation, desktop computers, laptop computers, tablet computers, mobile devices such as mobile phones, personal digital assistants, set-top boxes, or any combination of the above. A respective client computer 102 may contain one or more client applications 104 for submitting requests to the server system 106. For example, client application 104 can be a web browser or other application that permits a user to search for, browse, and/or use information (e.g., web pages and web services) accessible through the communication network 108.

The communication network(s) 108 can be any wired or wireless local area network (LAN) and/or wide area network (WAN), such as an intranet, an extranet, the Internet, or a combination of such networks. In some embodiments, the communication network 108 uses the HyperText Transport Protocol (HTTP) and the Transmission Control Protocol/Internet Protocol (TCP/IP) to transport information between different networks. The HTTP permits client devices to access various information items available on the Internet via the communication network 108. The various embodiments, however, are not limited to the use of any particular protocol.

In some embodiments, the server system 106 includes a front end server 112, a message signal extractor 114, an importance weight generator 116, an important message identifier 118, importance prediction models 122, a user account database 124, a message database 126, and a search engine 120 for searching message database 126.

The front end server 112 is configured to receive data from a client computer 102. In some embodiments the data is a message, HTTP request, Ajax request, or other communication. The HTTP request or Ajax request may include a search query (e.g., "label:inbox") for processing by the search engine 120.

In some embodiments, a message associated with a particular user is received by the server system 106, where user data regarding the particular user is stored in the user account database 124. The received message is stored in message database 126. In implementations that organize messages into conversations (sometimes called threads or message threads), the message is stored in message database 126 either as a new conversation, or as a new message in an existing conversation.

When a message is received by the server system 106, the message is sent from the front end server 112 to the message signal extractor 114, which extracts one or more message signals from the message. For each message signal of at least a subset of the extracted message signals, an importance weight is generated by importance weight generator 116 using importance prediction models 122. Based on the message signals and their generated importance weights, important message identifier 118 determines an importance score for the message. In some embodiments, the importance score of the message is used by important message identifier 118 for comparison with a threshold to determine importance of the message.

Figure 1B:
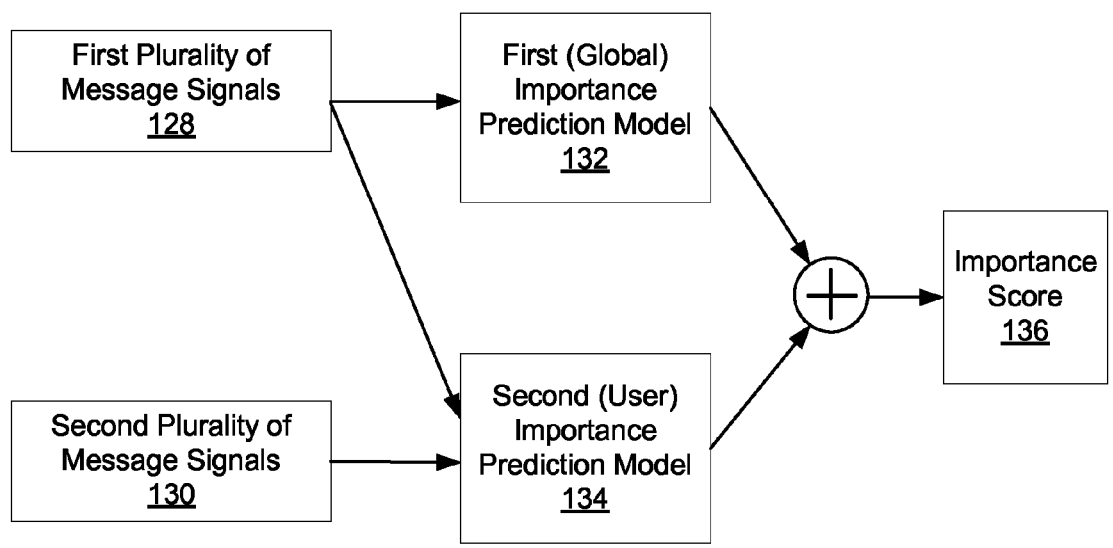
FIG. 1B is a block diagram illustrating a process of generating importance scores for messages according to some embodiments.

FIG. 1B is a block diagram illustrating a process of generating importance scores for messages according to some embodiments. Importance prediction models 122 include a first importance prediction model 132 and a second importance prediction model 134. Both the first importance prediction model 132 and the second importance prediction model 134 include a plurality of weights, each corresponding to respective message signals. The first importance prediction model 132 is based on information associated with multiple users. The first importance prediction model 132 is also called the global importance prediction model. The second importance prediction model 134 is based on information associated with a respective user (i.e., a single user). The second importance prediction model 134 is also called the user importance prediction model.

In some embodiments, the extracted message signals include a first plurality of message signals 128. For each message signal of the first plurality of message signals 128, the importance weight generator 116 generates an importance weight for the respective message signal by determining a first weight for the respective message signal using the first importance prediction model 132, determining a second weight for the respective message signal using the second importance prediction model 134, and combining the first weight and the second weight to determine the importance weight of the respective message signal. In some embodiments, the combining includes adding the first and second weight. Furthermore, in some implementations, the importance weight generator 116 performs table lookup or database lookup operations to obtain the first weight and second weight. As discussed below in more detail with reference to FIG. 5A, the importance weights in the various importance prediction models may be generated and updated using machine learning techniques. Optionally, in addition to a global importance prediction model and a user importance prediction model, the server system also uses a group importance prediction model, for a respective plurality of users (also called a group of users) that include the user for whom message services are being performed. In such implementations, weights from all three importance prediction models are determined and applied to corresponding extracted message signals so as to generate a combined importance score for a respective message.

It is noted that respective weights in the importance prediction models can have both positive and negative values. Weights with positive values are typically associated with message signals that are predictive of message importance. Weights with negative values are typically associated with message signals (e.g., a signal identifying that the message was automatically generated, or a signal that indicates the message includes one or more words on a predefined black list) that are associated with unimportant messages.

In some embodiments, the extracted message signals include a second plurality of message signals 130. For each message signal of the second plurality of message signals 130, importance weight generator 116 generates an importance weight for the respective message signal using second importance prediction model 134 but not first importance prediction model 132. Thus, the second plurality of message signals 130 are message signals for which user-specific weights are generated, but for which global model weights are not generated.

In some embodiments, important message identifier 118 determines importance score 136 for the message based on the generated importance weights of the first plurality of message signals 128. Alternatively, important message identifier 118 determines the importance score 136 for the message based on the generated importance weights of both the first plurality of message signals 128 and the second plurality of message signals 130.

Attention is now directed back to FIG. 1A. Once the importance score of the message has been determined by important message identifier 118, the message and information regarding importance of the message are stored in the message database 126. In some embodiments, information regarding importance of the message is the importance score of the message. In some embodiments, information regarding importance of the message are labels denoting importance. For example, in one implementation messages with these labels (which denote message importance) have an importance score above a threshold. Alternatively, conversations having at least one message with an importance score above the threshold are assigned a label denoting importance.

Search engine 120 communicates with message database 126 to retrieve the message along with information regarding importance of the message, and sends the message and information regarding importance of the message to front end server 112. Front end server 112 sends the message along with information regarding importance of the message to the user for display at a client device 102. Alternatively, message information corresponding to the message (e.g., the subject line of the message, information identifying the sender of the message, etc.) is sent by front end server 112, along with information regarding importance of the message to client device 102. In yet another alternative, message information corresponding to the conversation that includes the message (e.g., a subject line of a message in the conversation and/or a snippet of text from the conversation, information identifying the sender of the message, etc.) is sent by front end server 112, along with information regarding importance of the conversation to client device 102.

While the modules and data structures used to identify important messages have been illustrated above in server system 106, it should be understood that, in accordance with other embodiments, analogous modules and data structures which are also used to identify important messages are located at client computer 102 instead of, or in addition to, the modules and data structures shown in server system 106 above.

Figure 2:
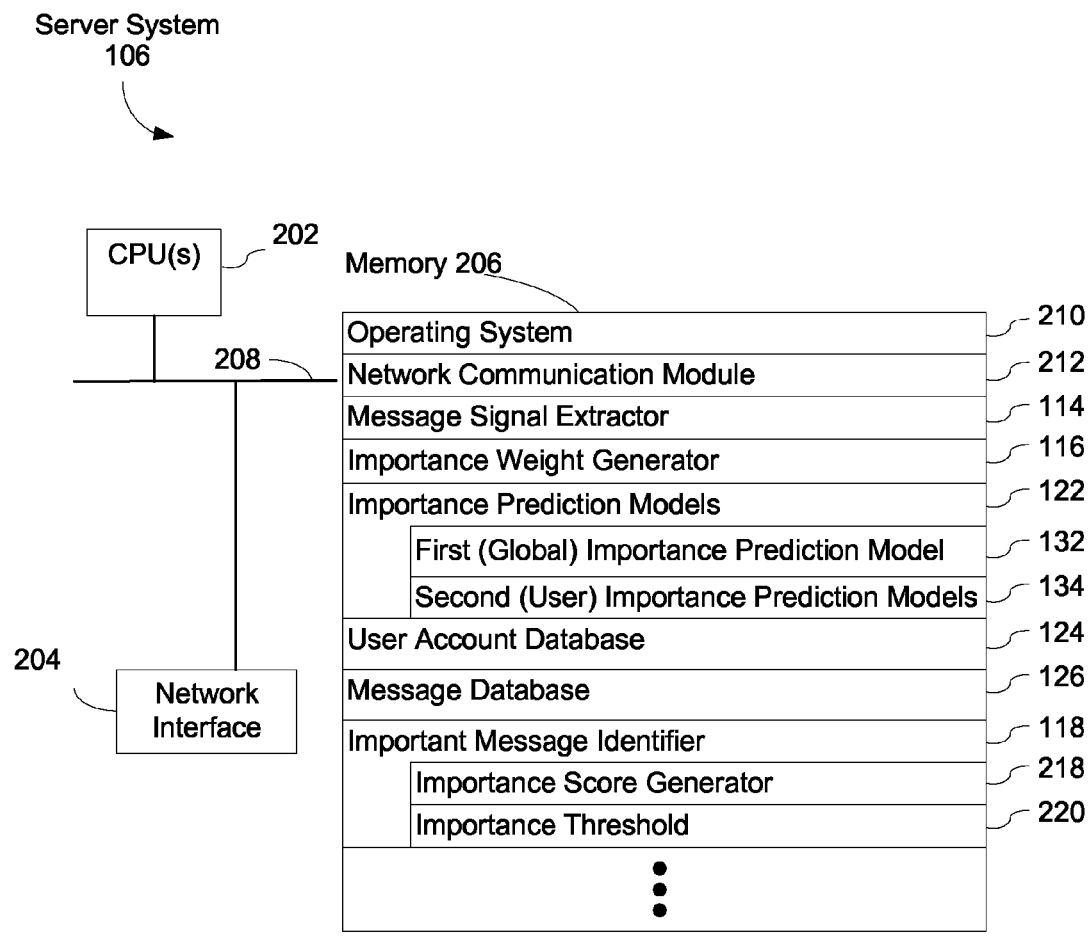
FIG. 2 is a block diagram illustrating a server system according to some embodiments.
Figure 3A:
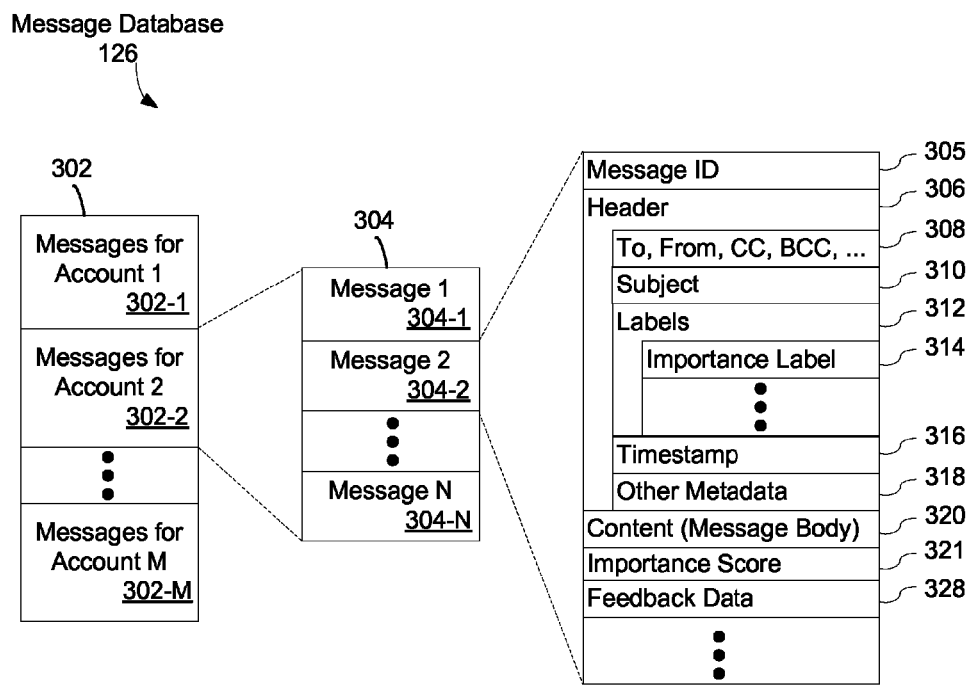
FIGS. 3A-3C are block diagrams of data structures for a message database a user account database, and an importance prediction models database, according to some embodiments.
Figure 3B:
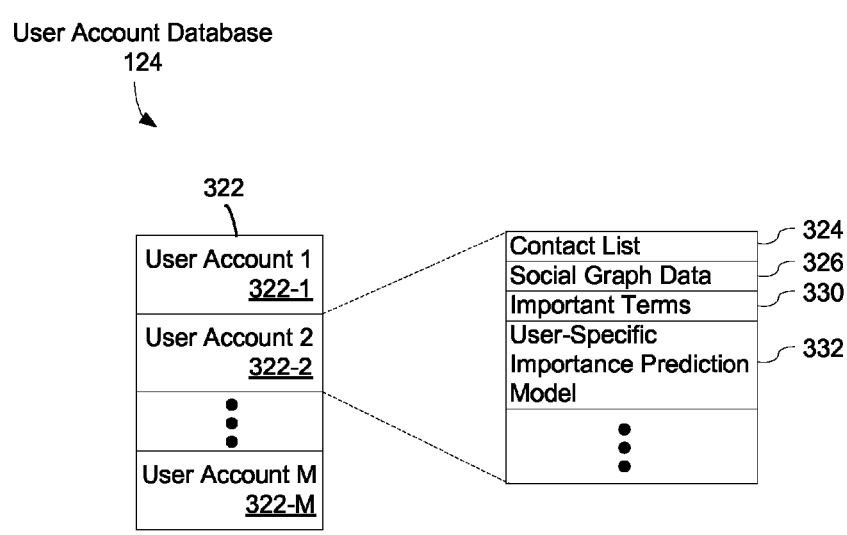

FIG. 2 is a block diagram illustrating a server system 106 in accordance with some embodiments. The server system 106 typically includes one or more processing units (CPU's) 202 for executing modules, programs and/or instructions stored in memory 206 and thereby performing processing operations; one or more network or other communications interfaces 204; memory 206; and one or more communication buses 208 for interconnecting these components. Communication buses 208 may include circuitry (sometimes called a chipset) that interconnects and controls communications between system components. Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternately the non-volatile memory device(s) within memory 206, comprises a non-transitory computer readable storage medium. In some embodiments, memory 206 or the computer readable storage medium of memory 206 stores the following programs, modules and data structures, or a subset thereof:

- an operating system 210 that includes procedures for handling various basic system services and for performing hardware dependent tasks;
- a network communication module 212 that is used for connecting the server computer 106 to other computers via the one or more communication network interfaces 204 (wired or wireless) and one or more communication networks, such as the Internet, other wide area networks, local area networks, metropolitan area networks, and so on;
- a message signal extractor 114, for extracting one or more message signals from the received message;
- an importance weight generator 116, for generating importance weights for each message signal of at least a subset of the extracted message signals;
- importance prediction models 122 including first importance prediction model 132 and one or more second importance prediction models 134 (e.g., one for each distinct user for whom message importance services are to be provided), for storing a plurality of weights, each corresponding to a respective message signal;
- a user account database 124, for storing user data, as discussed below with reference to FIG. 3B;
- a message database 126, for storing messages and related information, as discussed below with reference to FIG. 3A;
- an important message identifier 118, for generating importance scores for messages using an importance score generator 218; in some embodiments, the important message identifier 118 also includes an importance threshold 220 (or in some implementations, more than one importance threshold), which is used for determining importance of messages.

Each of the above identified modules, applications or programs corresponds to a set of instructions, executable by the one or more processors of server system 106, for performing a function described above. The above identified modules, applications or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows a "server system," FIG. 2 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a server system and how features are allocated among them will vary from one implementation to another, and may depend in part on the amount of data traffic that the system must handle during peak usage periods as well as during average usage periods.

FIG. 3A depicts an exemplary data structure of a message record 304 in message database 126 (FIG. 1A) according to some embodiments. The message database includes stores messages (in message records 304) for a plurality of user accounts such as Account 1, Account 2, ..., and Account M. For a specific account such as Account 2, the database stores a set 302 of message records 304 corresponding to a plurality of messages such as Message 1, Message 2, ..., and Message N. For a specific message such as Message 2, message data 304-2 includes header information 306 and message content 320. In some embodiments, message data 304-2 includes the importance score of the message 321. Optionally, message data 304-2 further includes a message identifier 305 that uniquely identifies the message, and/or a conversation identifier and message identifier that together uniquely identify the message. Optionally, message data 304-2 for a respective message includes feedback data 328 (e.g., one or more of: time elapsed between message receipt and reading, whether the user has replied or forwarded the message, whether the user has read or replied or forwarded the message more than once, whether the user has explicitly marked the message as being important, and whether the user has explicitly marked the message as not important).

In some embodiments, header information 306 includes information 308 identifying the senders and recipients of the message, the message subject 310, one or more labels (if any) applied to the message 312, one or more time stamps 316, and other metadata 318. In some embodiments, the labels applied to a respective message 312 include an importance label 314 (e.g., when the message importance score exceeds a threshold), which denotes importance of the message. The one or more time stamps 316 include information indicating the time when the message is received by the user account, and optionally include time information (which may be stored in the header 306 or elsewhere in the database 302) that indicates the time(s) when the user read the message and the time(s) when the user replied to the message. Thus, the one or more time stamps 316 may be useful in calculating how quickly the user reads, responds to or otherwise interacts with the message. Optionally, other metadata 318 includes one of more values such as the number of times the message has been read, forwarded, and other metrics of interaction. The message content 320 contains the content of the message, e.g., text, images, and attachments. Those of ordinary skill in the art would recognize other ways to store the message information. For example, an attachment might be stored in another storage structure with a reference to it stored in the message record 304.

FIG. 3B depicts an exemplary data structure of a user account record 322 in the user account database 124 (FIG. 1A) according to some embodiments. The user account record 322 includes a plurality of user accounts such as User Account 1, User Account 2, ..., and User Account M. For a specific user account such as User Account 2, user account record 322-2 includes a contact list 324 (or includes a pointer to contact list 324) that includes a list of contacts associated with the user, and optionally includes one or more of: social graph data 326, and important terms 330. Optionally, the user data 322-2 also includes a user-specific importance prediction model 332, which is described in greater detail below with respect to FIG. 3C.

Alternatively, user-specific importance prediction model 332 for a respective user or user account is stored in a separate database from user account database 124. It is noted that a user may have multiple accounts, or multiple usernames for messaging, and that in some implementations a single user-specific importance prediction model 332 is used in conjunction with two or more of the usernames and/or accounts of the user.

In some embodiments, the user has an associated social graph that includes one or more social graph members. Each of the one or more social graph members has a calculated social graph weight based on the interactions between the user and the respective social graph member. Social graph data 326 includes information regarding the one or more social graph members. In some embodiments, information regarding the one or more social graph members includes the calculated social graph weights of the one or more social graph members. Optionally, if the user sends and/or receives messages sent to a group of social graph members, social graph data 326 also includes weights for that group of members of the social graph. Thus, social graph data 326 for a respective user optionally includes weights for a plurality of groups of social graph members with whom the user has communicated as a group.

In some embodiments, server 106 (FIG. 1A) collects feedback data from the user regarding importance of a respective message. For example, the user may explicitly mark a message as important, or not important. In another example, the speed with which a user opens a new message, or deletes a message without opening it, may be treated as feedback data. Optionally, the feedback data from the user is stored in the user account database 124. Alternatively, the feedback data is stored in the message database 126. Feedback data from the user is described in more detail below with reference to FIG. 5C.

Important terms 330 include terms determined to be indicative of message importance. In some embodiments, important terms 330 are specific to the user, and thus a respective user account 322 includes a set of user-specific important terms 330. Important terms are described in more detail below with reference to FIG. 5A.

Figure 3C:
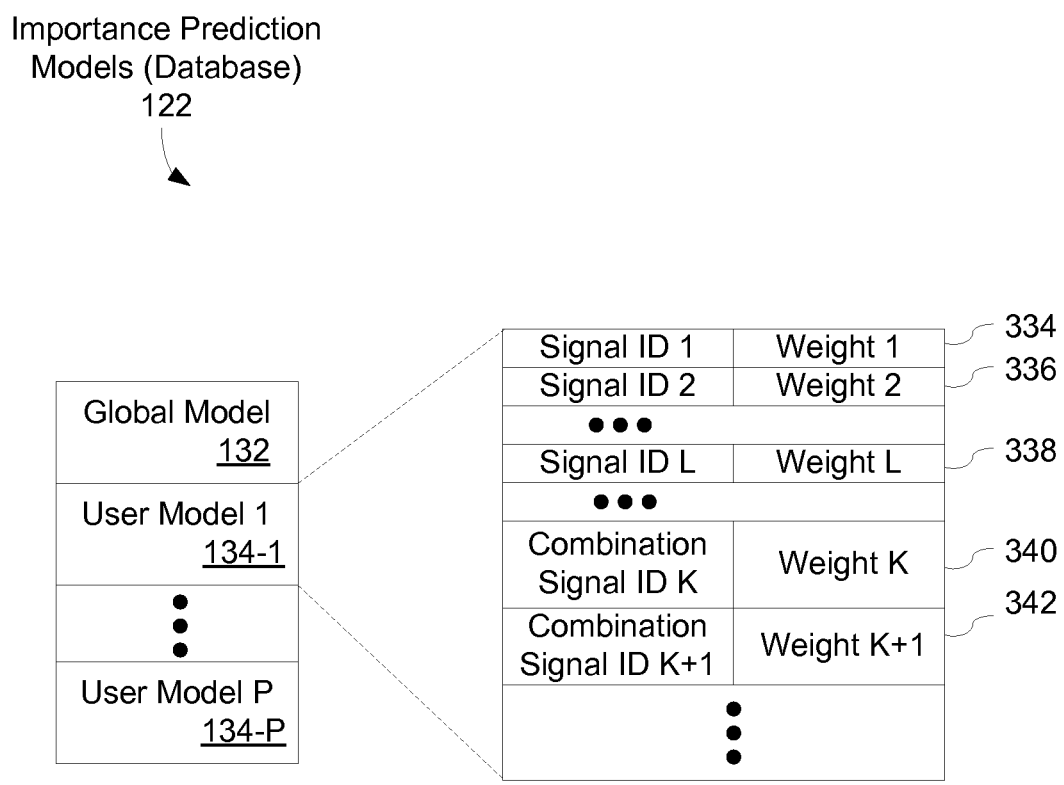

FIG. 3C depicts an exemplary data structure of importance prediction models 122 (FIG. 1A), according to some embodiments. Importance prediction models 122 includes a global importance prediction model 132 and a set of user importance prediction models 134 (FIG. 1B). User importance prediction models 134 include a plurality of user-specific importance prediction models, for a plurality of respective users. In this example, user-specific importance prediction models 134 include User Model 1, User Model 2, ..., and User Model P. Both global model 132 and user-specific model such as User Model 1 include a plurality of weights, each corresponding to a respective message signal or a respective combination message signal. In some implementations, the message signals used include both individual message signals (each based on a single message signal) and one or more combination message signals (each based on two or more message signals). Combination message signals are described in more detail below with reference to FIG. 5A. In some embodiments, as shown in FIG. 3C, the plurality of weights and signal identifiers for their respective message signals are stored in records 334, 336, 338, 340, 342 in a look-up table in importance prediction model database 122.

Figure 4:
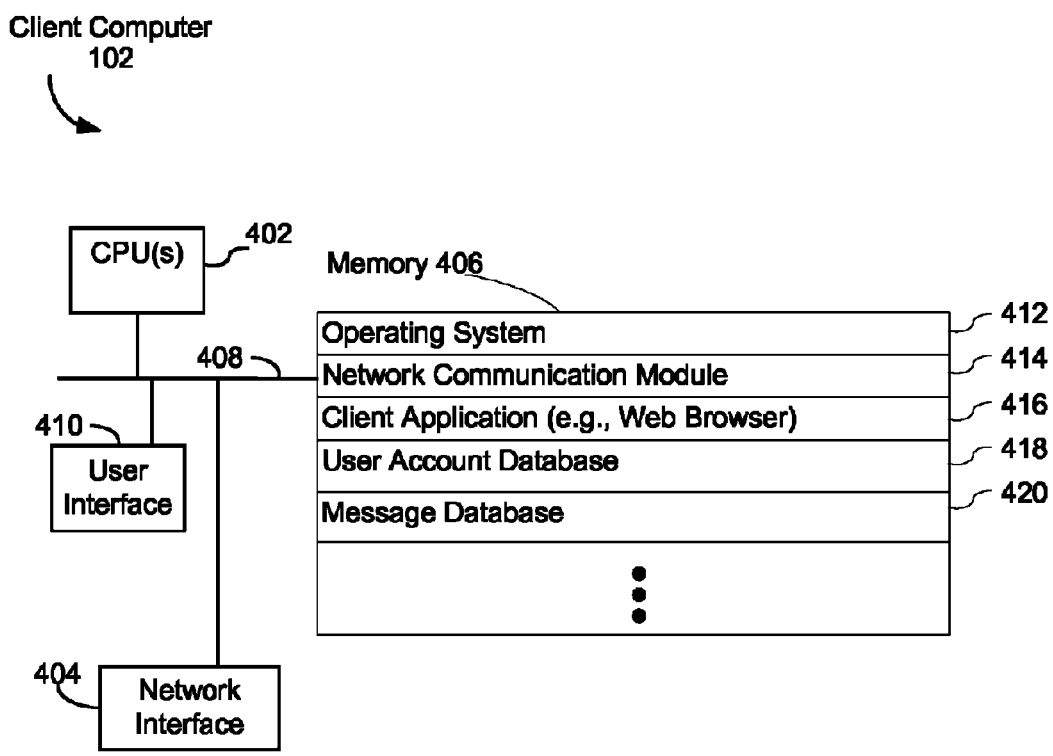
FIG. 4 is a block diagram illustrating a client system according to some embodiments.

FIG. 4 is a block diagram illustrating a client computer 102 in accordance with some embodiments. The client computer 102 typically includes one or more processing units (CPU's) 402 for executing modules, programs and/or instructions stored in memory 406 and thereby performing processing operations; one or more network or other communications interfaces 404; memory 406; and one or more communication buses 408 for interconnecting these components. Communication buses 408 may include circuitry (sometimes called a chipset) that interconnects and controls communications between system components. Client computer 102 optionally may include a user interface 410 comprising a display device and a keyboard, mouse, touch-sensitive surface or other input device. Memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. Memory 406, or alternately the non-volatile memory device(s) within memory 406, comprises a computer readable storage medium. In some embodiments, memory 406 or the computer readable storage medium of memory 406 stores the following programs, modules and data structures, or a subset thereof:

- an operating system 412 that includes procedures for handling various basic system services and for performing hardware dependent tasks;
- a network communication module 414 that is used for connecting the client computer 102 to other computers via the one or more communication network interfaces 404 (wired or wireless) and one or more communication networks, such as the Internet, other wide area networks, local area networks, metropolitan area networks, and so on;
- a client application 416, for rendering messages to the user of the client and receiving input from the user (e.g., labeling a message as important or unimportant);
- optionally, a user account database 418, for storing user data; and
- optionally, a message database 420, for storing messages and other communication received from a server system 106.

Each of the above identified modules, applications or programs corresponds to a set of instructions, executable by the one or more processors of client computer 102, for performing a function described above. The above identified modules, applications or programs (i.e., sets of instructions) need not be implemented as separate software programs, procedures or modules, and thus various subsets of these modules may be combined or otherwise re-arranged in various embodiments. In some embodiments, memory 406 may store a subset of the modules and data structures identified above. Furthermore, memory 406 may store additional modules and data structures not described above.

Figure 5A:
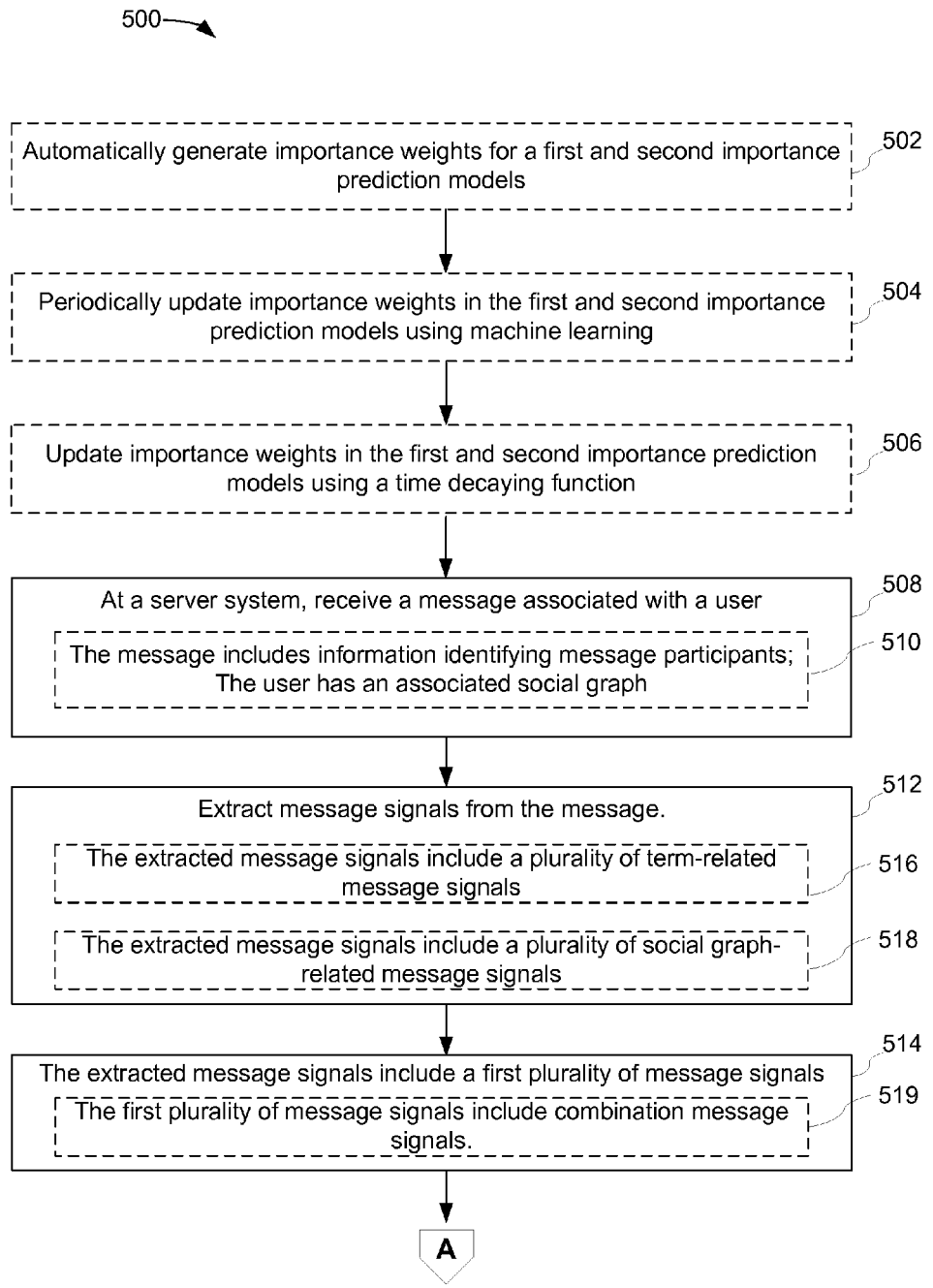
FIGS. 5A-5C are flowcharts representing a method for identifying important messages at a server, according to some embodiments.
Figure 5B:
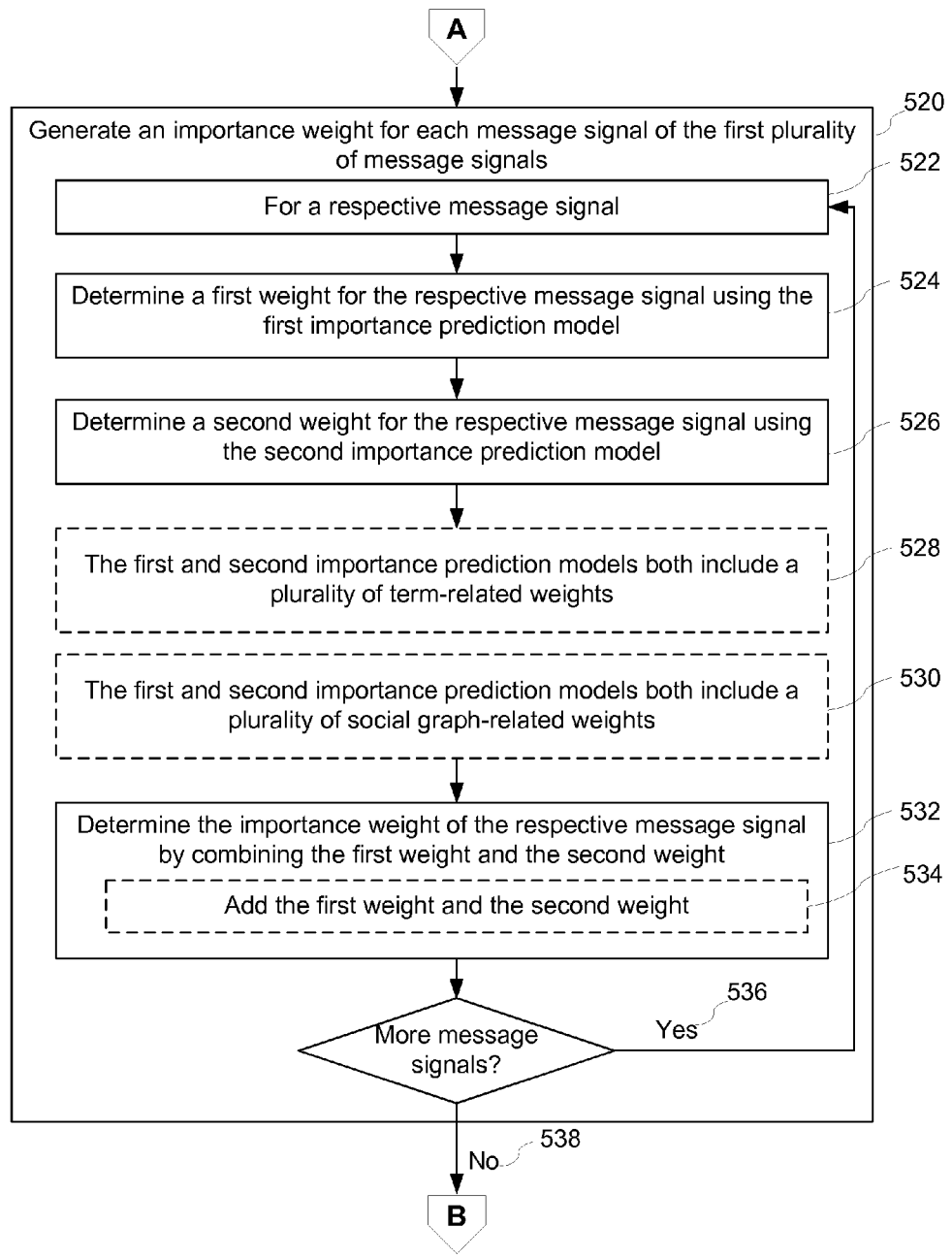
Figure 5C:
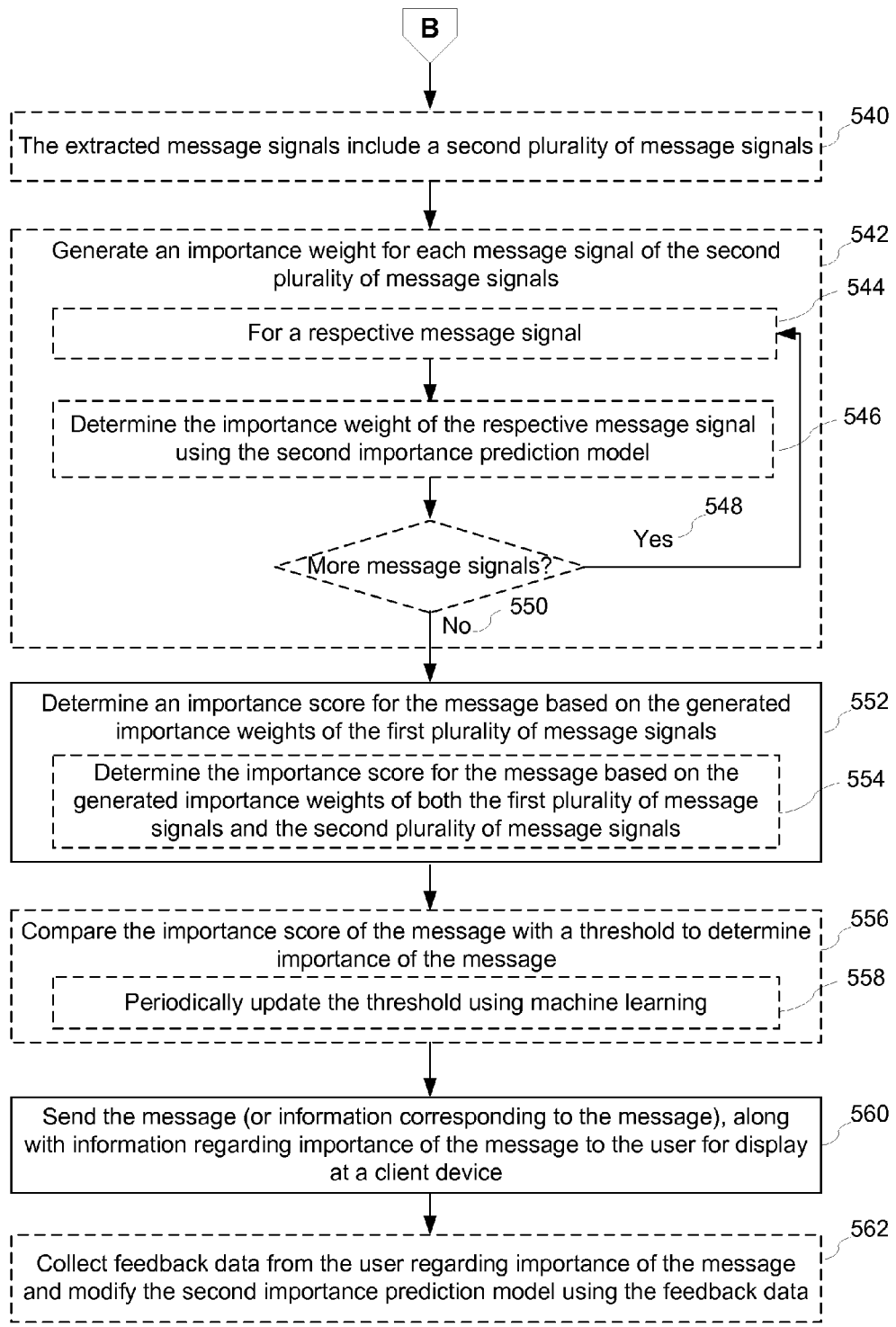

FIG. 5A-5C are flowcharts representing a server method 500 for identifying important messages, in accordance with some embodiments. Server method 500 may be governed by instructions that are stored in a computer readable storage medium and that are executed by one or more processors of one or more servers (see server system 106, FIG. 2). Each of the operations shown in FIG. 5 may correspond to instructions stored in a computer memory or computer readable storage medium (e.g., memory 206, FIG. 2). The computer readable storage medium may include a magnetic or optical disk storage device, solid state storage devices such as flash memory devices, or other non-volatile memory device or devices. The computer readable instructions stored on the computer readable storage medium are in source code, assembly language code, object code, or other instruction format that is interpreted by one or more processors.

In some embodiments, server 106 (FIGS. 1, 2) automatically generates (502) the plurality of weights included in first and second importance prediction models (132, 134, FIG. 1B) using data from message database 126 and user account database 124, without requiring the user to provide explicit feedback regarding importance of any messages. Each of the plurality of weights in the first and second importance prediction models corresponds to a respective message signal. In some embodiments, a message signal in the first (global) importance prediction model is given a greater weight if the server determines the probability is high that a common user will act within a predetermined amount of time upon messages exhibiting the message signal. The term "exhibited" is defined as follows. A message signal extracted from a respective message is said to be exhibited by that message. For example, the server may find that a common user will more likely respond within 48 hours to a message where the user is the only recipient than to other messages where the user is not the only recipient. In this example, the message signal "User is the only recipient" is given a greater weight than the message signal "User is not the only recipient" in the global importance prediction model. In some embodiments, a message signal in the second (user) importance prediction model is given a greater weight if the server determines the probability is high that a specific user will act within a predetermined amount of time upon messages exhibiting the message signal. For example, the server may find that a specific user is likely respond within 48 hours to messages from a person named "John Doe," and a corresponding message signal is given an commensurate weight. More generally, a weight is assigned to each message signal that is included in an importance prediction model that is commensurate with its predictive power, e.g., for predicting the likelihood that messages exhibiting the message signal will be opened by the user within a predefined period of time after the signal has been received in the user account.

In some embodiments, server 106 automatically generates and/or periodically updates (504) one or more of the importance weights in the first and second importance prediction models using machine learning. Machine learning includes a set of techniques, implemented using software tools and computer systems, that generate functions and predictive models (e.g., by determining weights to be applied to components of the functions or predictive models). Machine learning is well known to those skilled in the art and is therefore not described in detail in this document. In some embodiments, in order for the machine learning technique to adapt to changes in the activity in a user's messaging account (e.g., changes in the messages being received by a user, for example, a sudden influx of messages concerning events such as holidays, and/or changes in a user's behavior), the server creates a user profile that is independent of the importance prediction model for a respective user. The user profile tracks user behavior-related statistical data, such as the number of messages the user receives, reads or replies to per day, the percentage of messages read or replied to by the user per day and the number of messages marked as important by the user per day. When the user profile indicates that characteristics of the messages being received by the user deviate from those normally received by the user in the past, and/or indicates that the user's behavior with respect to received messages deviates from the user's normal behavior with respect to one or more statistical data by more than a predetermined amount, the machine learning technique will ignore any new user data in the learning process until either the deviation of received messages and/or user behavior ends, or the deviation of received messages and/or user behavior persists long enough so that it becomes the new normal with respect to received messages and/or user behavior.

Optionally, the server updates (506) one or more of the importance weights in the first and second importance prediction models using a time-dependent decay function to discount over time the importance of user actions with respect to messages having a respective message signal. Thus, the influence of user actions (e.g., opening, replying, deleting) on messages exhibiting a message signal are discounted by an amount that corresponds to how long ago the user actions occurred. For example, in these embodiments, a user action that occurred two weeks ago (or perhaps two months ago) is more heavily discounted than a similar user action that occurred one day ago.

In some embodiments, server 106 receives (508) a message associated with a user. The received message includes (510) information identifying message participants. Message participants include people listed in one or more of the To, From, and Cc fields of the message, and possibly in other fields as well (e.g., a Reply-To field, if provided). In some embodiments, message participants also include people listed in the To, From, Cc, . . . fields of other messages that are in the same conversation as the received message. In some embodiments, the user has (510) an associated social graph (326, FIG. 3B). In some circumstances, the user's social graph data 326 (FIG. 3B) includes information regarding one or more of the message participants.

In some embodiments, server 106 extracts (512) one or more message signals from the message. In some embodiments, some of the message signals are extracted from the message header. Examples of message signals extracted from the message header include: a signal identifying whether the user is the only recipient of the message, a signal identifying whether the message is sent by the user, a signal identifying whether the subject of the message contains one or more words conveying importance (e.g., "important," "please read," "urgent," "action needed," "confidential" and "reminder"), a signal identifying whether the subject of the message contains the user's display name, one or more signals identifying the labels (if any) applied to the message, a signal identifying whether the message is addressed to the user using the Bcc field; a signal indicating if the message was sent to a list to which the user has subscribed; one or more signals indicating whether the message was sent from one or more particular domains (e.g., domains identified in a user profile as domains from which the user appears to receive important messages (or unimportant messages), based on prior user actions with respect to such messages); and one or more signals indicating whether the received message was sent during a correspond time-of-day range (e.g., 8 AM-5 PM, 5:01 PM-11 PM, or 11:01 PM-7:59 AM). The example given here are non-exhaustive; many other messages signals may be generated based on information extracted from the message.

In some embodiments, some of the message signals are extracted from the message body, i.e., content of the message. Examples of message signals extracted from the message content include: a signal identifying whether the content contains one or more words conveying importance, a signal identifying whether the content contains the user's display name.

In some embodiments, when generating an importance score for a received message, message signals are extracted from the context of the received message (also herein called the current message) within a thread that includes at least one earlier message. Examples of message signals extracted from the context of the message within a thread include: a signal indicating whether the thread is initiated by the user, a signal identifying whether the message is the first message in the thread, a signal identifying whether the user has replied to a message in the thread, and one or more time related signals, such as signals identifying how long an earlier message in the thread (i.e., a message received prior to the current message) has remained unread by the user, and/or how quickly the user first read or responded to an earlier message in the thread.

In some embodiments, the extracted message signals include (516) a plurality of term-related message signals. A term-related message signal corresponds to presence or quantity of important terms in the message, where important terms include terms determined to be indicative of message importance. Examples of important terms include "important," "please read," "urgent," "action needed," "confidential," "reminder," and the name of the respective user. Some important terms apply to multiple users, and some important terms only apply to a specific user. In some embodiments, the number of important terms (e.g., terms found in one or more lists of important terms) in a message (e.g., in the message body and/or message subject) are counted. In some embodiments, the count of important terms in a message includes important terms in the subject of the first message in a conversation but not in the subjects of other messages in the conversation, to avoid repetitively counting the same term. Optionally, the extracted message signals include multiple signals, each of which corresponds to a particular count or range of counts of important terms in the received message. For example, the extracted message signals may include: one important term; 2 important terms; 3 to 4 important terms; 5 or more important terms; and, one or more important terms in message subject. Optionally, the important term list for a respective user is updated periodically, or from time to time, based on recently received messages or based on messages received since the last time the important term list was generated or updated.

In some embodiments, the extracted message signals include (518) a plurality of social graph-related message signals. Examples of social graph-related message signals include: a signal identifying the percentage of messages the user reads from the sender of the message, a signal identifying the percentage of messages the user reads that have at least one of the same recipients as the received message, a signal identifying the percentage of messages that are read out of the total messages sent to exactly the same group of recipients, a signal identifying whether the sender of the message has a corresponding social graph weight associated with the user, a signal identifying the social graph weight of the sender. Social graph weight is described above with reference to FIG. 3B.

In some embodiments, the extracted message signals include (514) a first plurality of message signals. Optionally, each of the first plurality of message signals has corresponding importance weights in both the global importance prediction model and the user importance prediction model. For a respective message signal in the first plurality of message signals, its first (global) weight in the global importance prediction model is a baseline value of the importance weight of the message signal, while its second (user) weight in the user importance prediction model represents how much the user model deviates from the global model, in other words, the difference between the user model and the global model. For example, a respective message signal in the first plurality of message signals has a first weight equal to 0.5 in the global importance prediction model and a second weight equal to −0.2 in the user importance prediction model, where the difference between the global model and the user model for this respective message signal is quantitatively expressed as −0.2.

In some embodiments, the first plurality of message signals include (519) one or more combination message signals, where a combination message signal includes combination of two or more other message signals. In some embodiments, two or more message signals are combined using a logic function (e.g. AND, OR, XOR . . . ) to generate a combination message signal. Weights are generated for the generated combination message signal and used to help determine message importance. For example, the server extracts a first message signal "This message was from a very important person (VIP): True or False," and a second message signal "The message was sent by an automated system: True or False." The two message signals can be combined into one combination message signal using a logic AND function; for example, the combination message signal is determined to be True only when "the message is sent by a VIP" AND "the message is NOT sent by an automated system." It is advantageous to use combination message signals in cases where the combination message signal has been determined (e.g., through the use of machine learning) to have greater message importance predictive power than the combination's constituent message signals in isolation.

In some embodiments, server 106 generates (520) an importance weight for each message signal of the first plurality of message signals. For a respective message signal (522), server 106 determines (524) a first weight for the respective message signal using the first (global) importance prediction model. The server also determines (526) a second weight for the respective message signal using the second (user) importance prediction model.

In some embodiments, both the first and second importance prediction models include (528) a plurality of term-related weights, each corresponding to a term-related message signal. Term-related message signals are described in more detail above with reference to FIG. 5A.

In some embodiments, both the first and second importance prediction models include (530) a plurality of social graph-related weights, each corresponding to a social graph-related message signal. Social graph-related message signals are described in more detail above with reference to FIG. 5A.

In some embodiments, server 106 determines (532) the importance weight of a respective message signal by combining the first and the second weights. In some embodiments, the importance weight of the respective message signal is determined (534) by adding the first weight and the second weight.

Operations 522 to 534, for determining the importance weight for a respective message signal, are repeated (536) for each message signal in the first plurality of message signals. In some embodiments, upon determining (538) that an importance weight has been generated for each and every message signal in the first plurality of message signals, server 106 determines (552) an importance score for the message based on the generated importance weights of the first plurality of message signals. In some embodiments, the importance score of the message is determined by adding up the importance weights of each message signal in the first plurality of message signals.

In some embodiments, the extracted message signals further include (540) a second plurality of message signals. In some embodiments, each of the second plurality of message signals has corresponding importance weights in only the user importance prediction model but not the global importance prediction model. In these embodiments, the server generates (542) an importance weight for each message signal of the second plurality of message signals. For a respective message signal (544), server 106 determines (546) the importance weight for the respective message signal using the second (user) importance prediction model but not the first (global) importance prediction model. These operations are repeated so as to determine the importance weight for each respective message signal in the second plurality of message signals (548).

Upon determining (550) that an importance weight has been generated for each and every message signal in the first and second pluralities of message signals, server 106 determines (554) an importance score for the message based on the generated importance weights of the first and second pluralities of message signals. In some embodiments, the importance score of the message is determined by adding up the importance weights of each message signal in the first and second pluralities of message signals. In some embodiments, the server determines importance scores for the message and a plurality of other messages using the method described above and then orders the message and the plurality of other messages based on their importance scores.

In some embodiments, after determining an importance score for the message, server 106 compares (556) the importance score of the message with a threshold to determine importance of the message. In some embodiments, messages with importance scores greater than the threshold are determined to be important. In some embodiments, messages with importance scores less than the threshold are determined to be unimportant. In some embodiments, the threshold is predetermined by the server. In some embodiments, the server periodically updates (558) the threshold using machine learning.

In some embodiments, the server compares the importance score of the message with multiple thresholds to determine a level of importance for the message. For example, the server compares the importance score of the message with two thresholds T1 and T2, where T1 is less than T2. If the importance score of the message is greater than T2, the message is determined to be "Very Important;" if the importance score of the message is less than T2 but greater than T1, the message is determined to be "Important;" if the importance score of the message is less than T1, the message is determined to be "Unimportant." By comparing the importance score of multiple received messages with the multiple thresholds, each of the received messages is assigned an importance level and the messages are divided into tiers or levels of importance.

In some embodiments, the server sends (560) the message (or message information concerning the message) along with information regarding importance of the message to the user for display at a client device. In some embodiments, information regarding importance of the message includes instructions for displaying the message in a sub-region of a display window where the sub-region is used to display important messages, as described in greater detail below with reference to FIG. 6A, which depicts a "Sorted Inbox" user interface of a messaging application. In some embodiments, information regarding importance of the message includes instructions for displaying a predefined label to denote importance of the message, as described in greater detail below with reference to FIG. 6A. As noted above, instead of sending the message itself along with the importance information, the server may send information corresponding to the message (e.g., the subject line of the message, information identifying the sender of the message, information identifying a subject of the conversation to which the message belong, etc.) along with the message importance information.

Figure 6A:
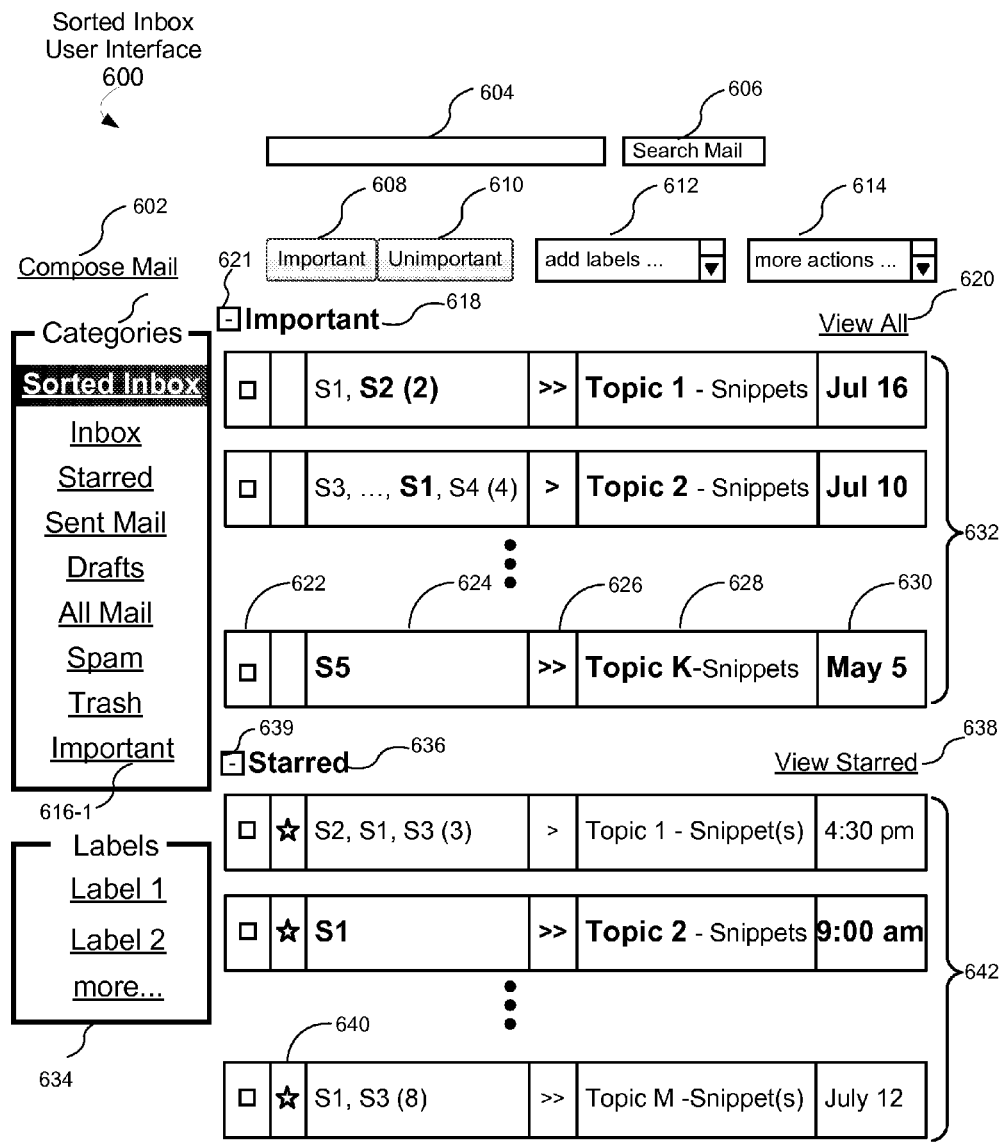
FIG. 6A is a schematic screenshot of a "Sorted Inbox" user interface of a messaging application in which lists of conversations are displayed in two non-overlapping areas of the display, the two areas of the display including an "Important" link and a "Starred" link respectively, according to some embodiments.
Figure 6B:
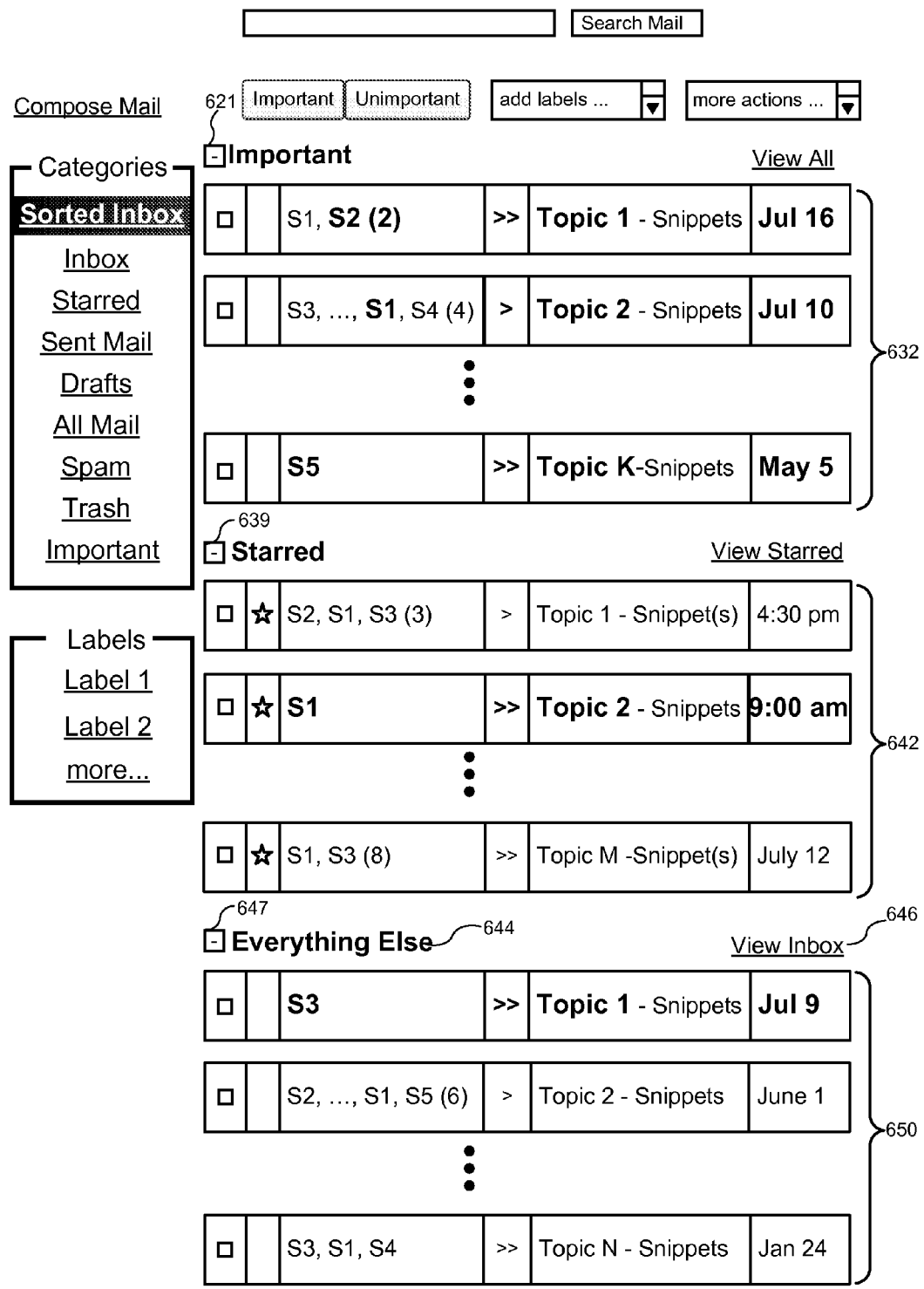
FIG. 6B is a schematic screenshot of a "Sorted Inbox" user interface of a messaging application in which lists of conversations are displayed in three non-overlapping areas of the display, the three areas of the display including an "Important" link, a "Starred" link and an "Everything Else" link respectively, according to some embodiments.
Figure 6C:
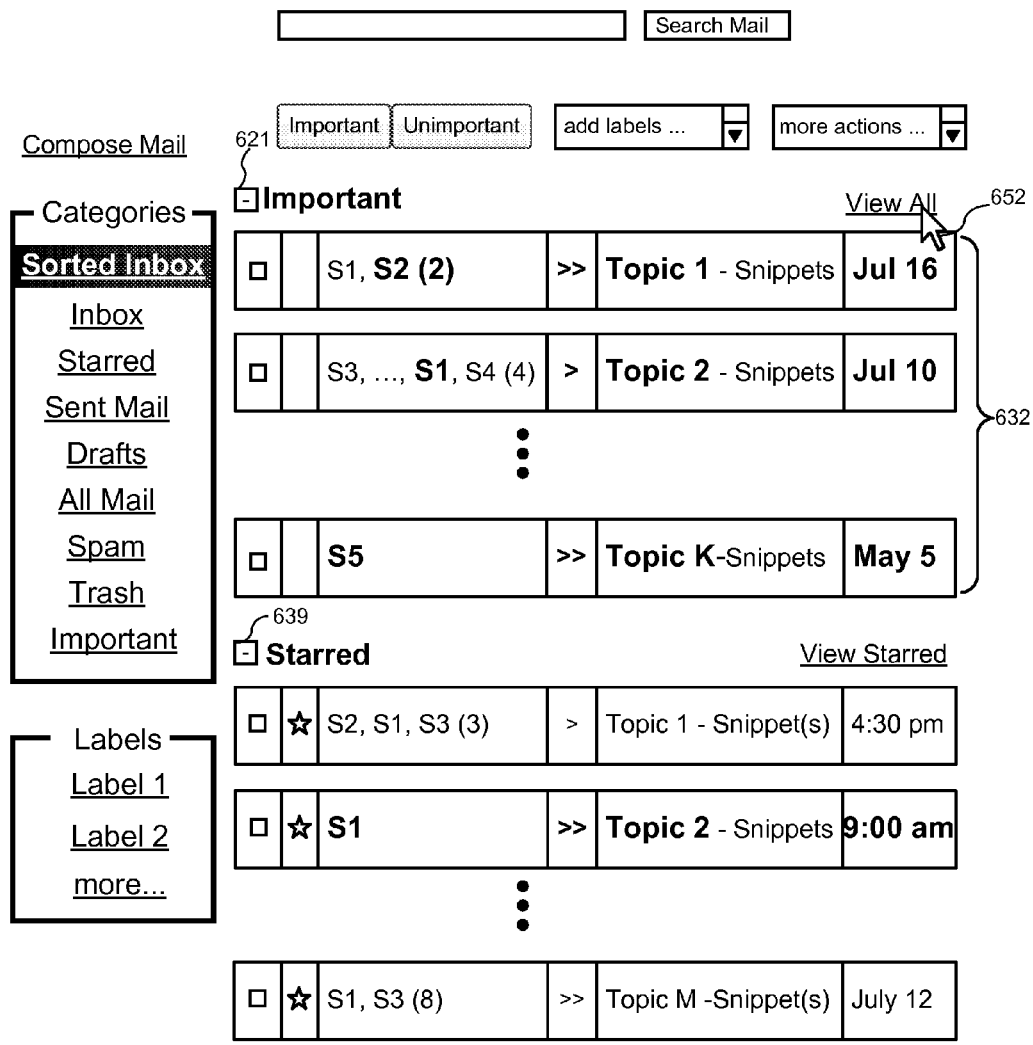
FIG. 6C is a schematic screenshot of a "Sorted Inbox" user interface of a messaging application, depicting how a user expands the area (of the messaging application user interface) labeled "Important" by selecting a "View All" link, according to some embodiments.
Figure 6D:
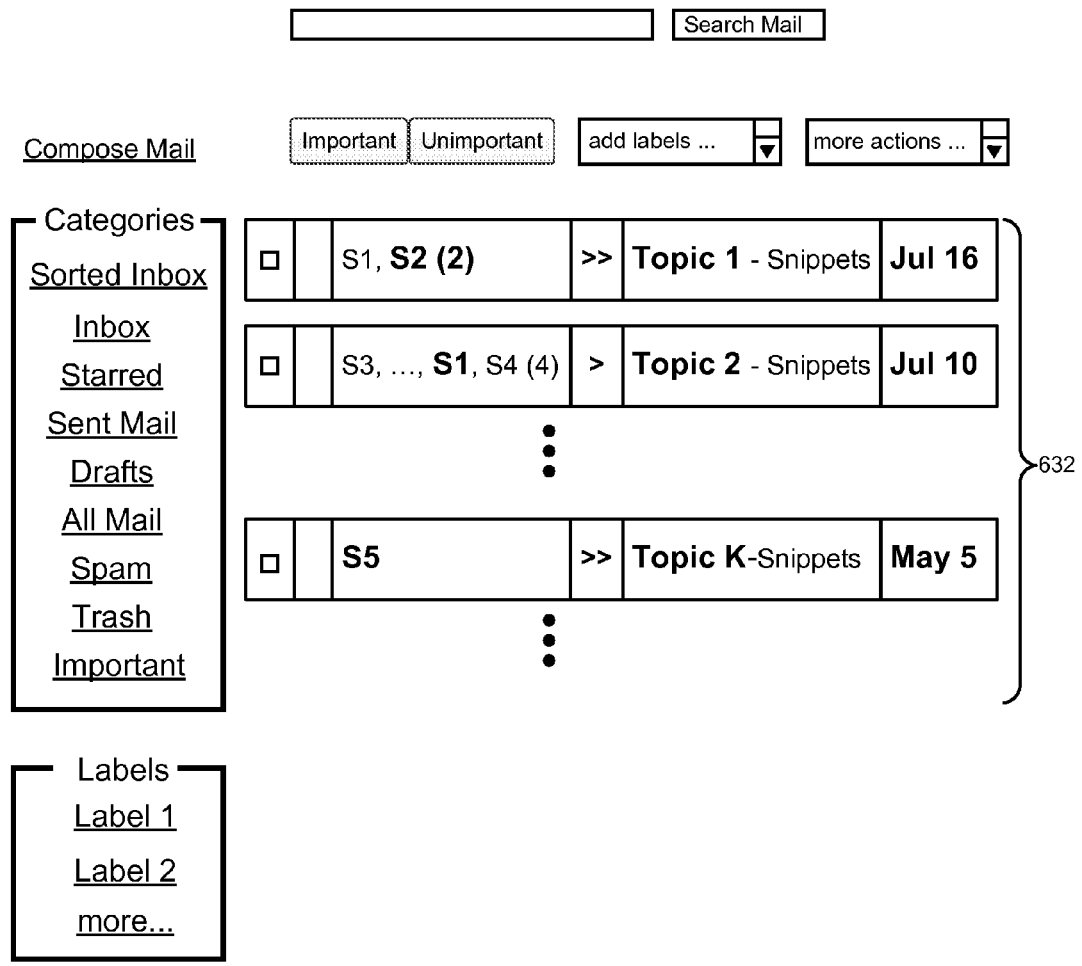
FIG. 6D is a schematic screenshot of the area (of a messaging application user interface) labeled "Important" in its expanded state, according to some embodiments.
Figure 6E:
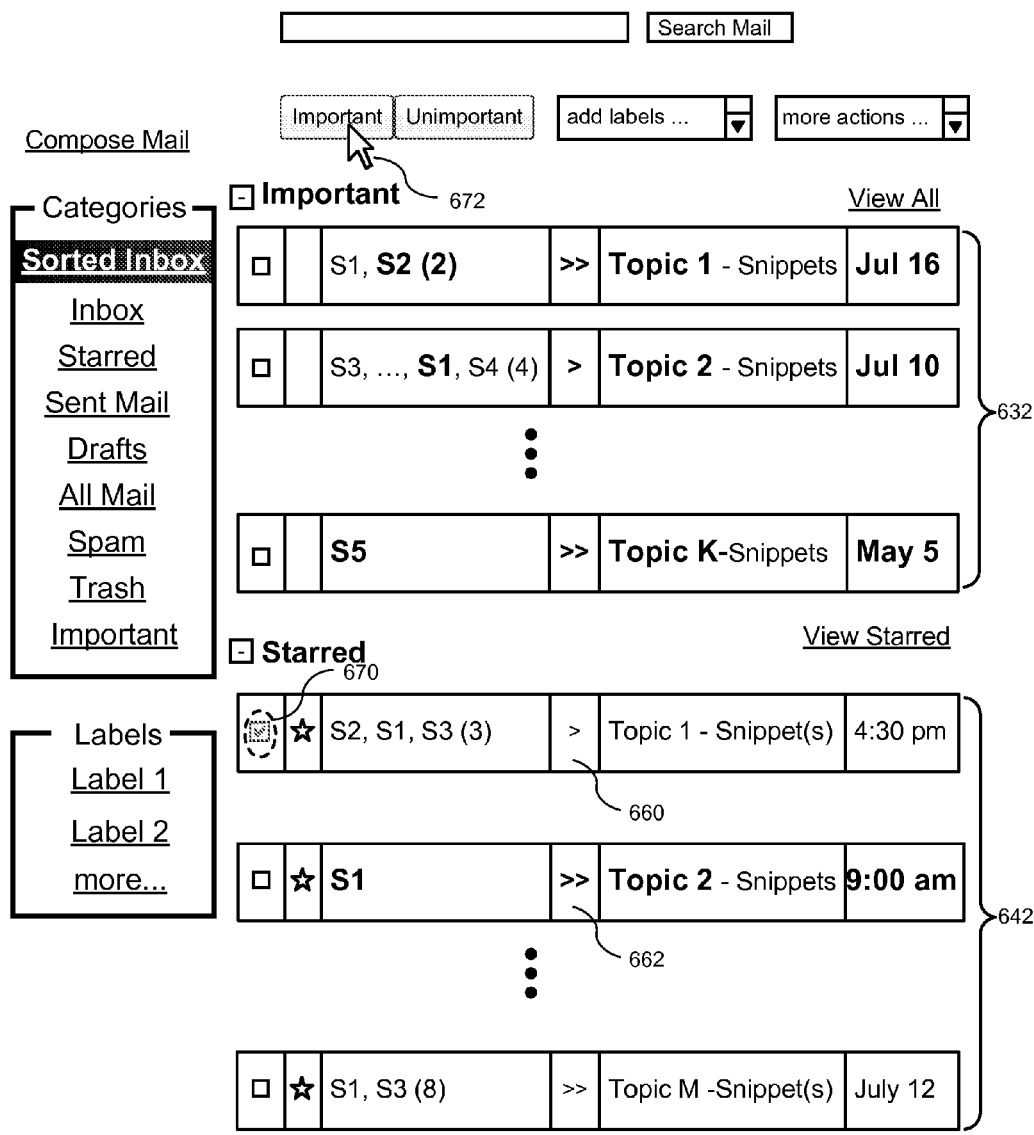
FIG. 6E is a schematic screen shot of a messaging application user interface, depicting how a user can mark an item as important by selecting the item and clicking on an "Important" button, according to some embodiments.
Figure 6F:
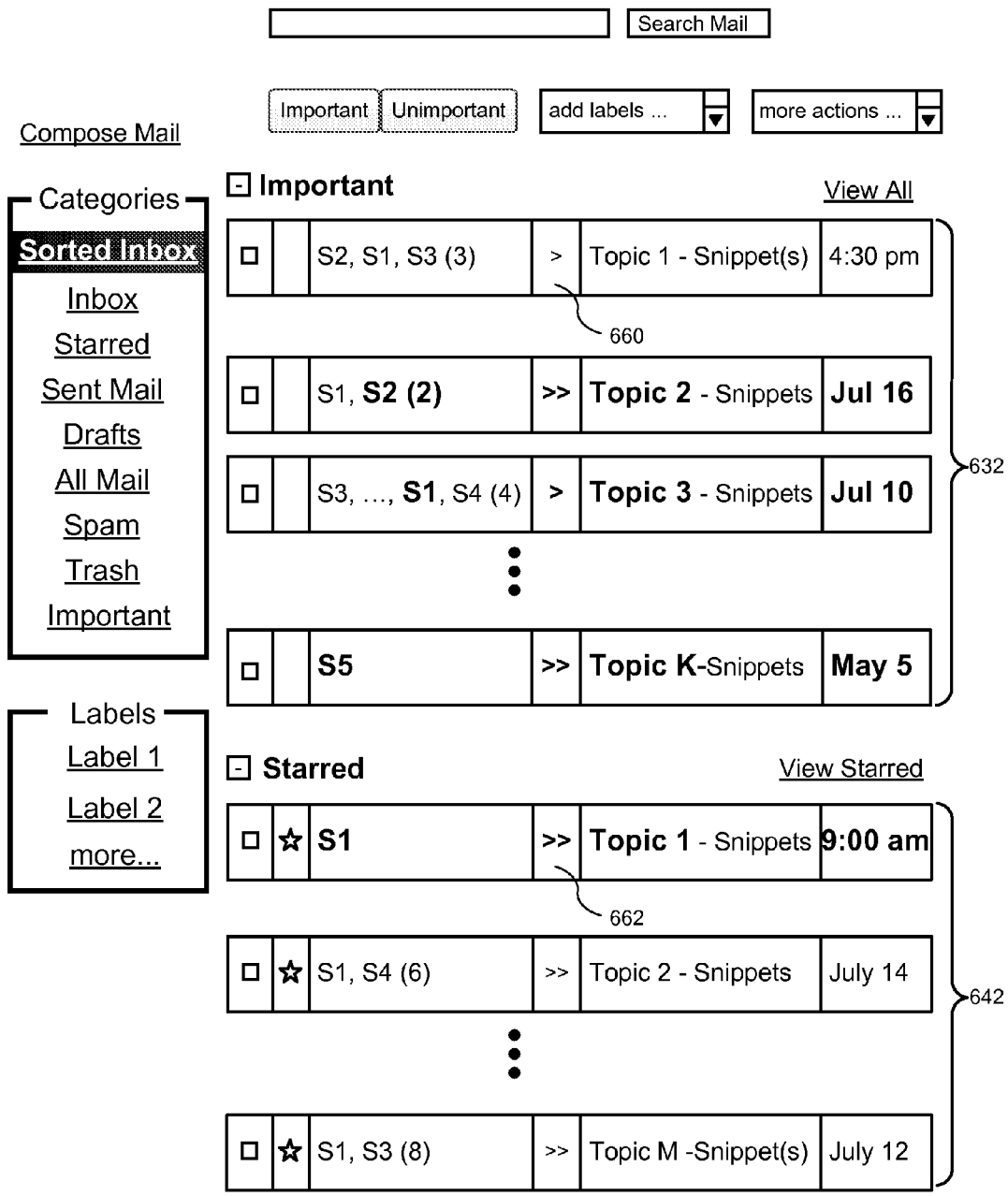
FIG. 6F is a schematic screen shot of a messaging application user interface, depicting an item being moved from the area "Starred" to the area "Important" after being marked as important by the user, according to some embodiments.

In some embodiment, after the server sends the message (or message information) along with information regarding importance of the message to the user for display, the user can optionally provide feedback data regarding importance of the message or any other messages, for example by marking one or more of the messages as "important" or "unimportant," as illustrated in FIGS. 6E-6F. In some embodiments, server 106 collects (562) the optional feedback data from the user regarding importance of the message or any other messages, and incorporates the optional user feedback data in generating and/or updating (562) importance weights for the second (user) importance prediction model. In another embodiment, server 106 collects (562) the optional feedback data from the user regarding importance of the message or any other messages, and incorporates the optional user feedback data in generating and/or updating importance weights for both the first (global) and second (user) importance prediction models, but the user feedback data is given lower weight for updating the global model than for updating the user model.

FIG. 6A is a schematic screenshot of a "Sorted Inbox" user interface 600 of a messaging application in which lists of conversations are displayed in two non-overlapping areas of the user interface 600, according to some embodiments. At the top left corner of the screenshot, there is a "Compose Mail" link 602. The user clicks on link 602 to start writing a new message. Nearby link 602, there are a textbox 604 and a "Search Mail" button 606. After the user submits one or more query terms through textbox 604 and clicks on the "Search Mail" button 606, the system generates a new display listing messages or conversations matching the query terms. Nearby textbox 604 are two importance marking affordances (sometimes called buttons, or user interface buttons), "Important" 608 and "Unimportant" 610. The user selects one of the two affordances to mark a message or conversation as important or unimportant, which will be described in more detail below with reference to FIGS. 6E-6F. Next to the "Important" and "Unimportant" affordances are two pull-down lists: "add label" list 612 and "more actions" list 614. Right below the "Compose Mail" link 602, there are a series of group boxes, each box corresponding to a system-defined category, represented by a respective system-defined label such as "Sorted Inbox," "Inbox," "Starred," "Sent Mail," "Drafts," "All Mail," "Spam," "Trash," "Important," etc. In some embodiments, the set of system-defined categories may be different, including a subset of these categories and/or additional categories. Below "Categories" group boxes 616, there are another series of group boxes, each box corresponding to a user-defined category represented by a respective user-defined label such as Label 1, Label 2 . . . , etc. Note that since the current screenshot displays only conversations belonging to the "Sorted Inbox" category, the corresponding link in group boxes 616 has been highlighted.

In some embodiments, the "Sorted Inbox" category includes messages and conversations organized and displayed according to importance of the respective message or conversation, as described in more detail below with reference to FIGS. 6A-6F. In some embodiments, the "Starred" category includes messages and conversations in which the user plans to be actively involved, e.g., by sending messages to other participants, which is similar to a "To Do" list. Thus, in some embodiment, a message may be flagged with a predefined label such as a star 640, so that a user can search for starred messages. In some embodiments, the "Important" category 616-1 includes messages and conversations that have been determined to meet predefined message importance criteria. The predefined message importance criteria are described in more detail above with reference to FIG. 5C.

Next to "Categories" group box 616 and below the row of buttons 608, 610 and drop down boxes 612, 614 there is message area of the user interface, which is used to display message information (e.g., a list of conversations matching a query, or the messages in a conversation), representing a set of messages. Typically, the message information is for messages to and from the message account of a respective user. Typically, the displayed message information includes or concerns messages in which the respective user is a participant (e.g., specified in the To, Cc, or Bcc field of each message). In some embodiments, the displayed messages are (or include) email messages. Optionally, the displayed message information includes or concerns two or more types of messages, such as two or more of: email messages, chat messages, SMS messages, voice messages, and video messages.

In some embodiments, the message area concurrently displays message information for a first set of messages 632 in a first area of the user interface, and message information for a second set of messages in a second area of the user interface that is separate from the first area. As shown in FIG. 6A, in some embodiments, the first area in the message area includes a heading 618 (e.g., "Important") to identify the messages displayed in the first area. Heading 618 is displayed at the top left corner of the first area. Optionally, heading 618 is also a link 618 that, when selected by a user, provides the user with options for determining which messages are to be displayed in the first area of the user interface, and more generally for configuring that area of the user interface. Similarly, the heading for each additional message area (e.g., heading 636 above the second area and heading 644 above the third area) is also a link that, when selected by a user, provides the user with options for determining which messages are to be displayed in that area of the user interface, and more generally for configuring that area of the user interface.

Below heading 618 is a list of messages or conversations 632 each occupying one row in the first area. Each conversation/message displayed in the first area meets predefined message importance criteria, and each conversation displayed in the first area has at least one message meeting the predefined message importance criteria. The predefined message importance criteria are described in more detail above with reference to FIG. 5C. It should be noted that it is advantageous to display only messages that have been determined to meet the predefined importance criteria in the first area because it enables the user to quickly and conveniently locate messages that have been determined to be important, without having to browse multiple pages of messages to locate important messages on each page.

In some embodiments, each row in the first area includes a checkbox 622, and information for one conversation, including: a sender list 624, a recipient status indicator 626, a message/conversation topic and snippet of the message/conversation 628 and a date/time value 630 (e.g., the date/time of receipt of the last message in the listed conversation). Additional information about each of these fields can be found in U.S. Pat. No. 7,584,426 (see, for example, description of FIG. 3B), which is hereby incorporated by reference in its entirety. In some embodiments, the set of fields displayed may be different, including a subset of the aforementioned fields and/or additional fields. In some embodiments, checkbox 622 is checked by the user if the user decides to move the corresponding message or conversation from one system-defined category, e.g., "Inbox", to another one, e.g., "Trash", or if the user decides to attach a user-defined label to the corresponding conversation, or if the user decides to move the corresponding message or conversation from one area of the display to another one. At the top right corner of the first area, there is a "View All" link 620 (also called an expansion affordance), which is described in greater detail below with reference to FIGS. 6C-6D. Optionally, the "Sorted Inbox" user interface 600 of the messaging application also includes a collapse affordance 621 for collapsing the first area and thereby removing items previously listed in the first area from being displayed the user interface. Optionally, each of the distinct message areas of the "Sorted Inbox" user interface 600 includes a respective collapse affordance (e.g., collapse affordances 621 and 639 in FIG. 6A, and 621, 639 and 647 in FIG. 6B) for collapsing the corresponding area of the user interface and thereby removing items previously listed in the respective area from being displayed the user interface.

In some embodiments, the list of messages and conversations 632 is displayed in chronological order in the first area. In some embodiments, messages that have been received most recently are displayed above messages that have been received earlier. It is advantageous to display the list of important messages 632 in chronological order because chronological order makes the most intuitive sense to many users; some users may be confused if conversations or messages are not displayed in chronological order.

In some embodiments, messages and conversations that have not been read by the user are highlighted. In some embodiments, all messages in the list of important messages 632 are unread by the user, and all conversations in list 632 have at least one message that is unread by the user. It is advantageous to display only unread messages that have been determined to meet the predefined importance criteria in the first area because it enables the user to quickly and conveniently locate unread messages that have been determined to be important, which in many cases are among the most important messages to the user. Optionally, the user is given the option of displaying important conversations/messages in the list 632, without regard to whether the user has read all the messages in the list 632.

In some embodiments, the message area of the display window in FIG. 6A further includes a second area with a heading 636 (e.g., "Starred") displayed at the top left corner of the second area. Below heading 636 is a list of conversations 642 each occupying one row in the second area. Each conversation in list 642 has at least one message flagged by the user with the predefined label. Alternatively, in embodiments that show a list of messages instead of a list of conversations, each message in list 642 would be a message flagged by the user with the predefined label. In some embodiments, a star symbol 640 is displayed next to the conversation/message checkbox for each conversation/message in list 642. At the top right corner of the second area, there is a "View Starred" link 638 (also called an expansion affordance), which is described in greater detail below with reference to FIGS. 6C-6D. In some embodiments, the list of messages and conversations 642 is displayed in chronological order in the second area. In some embodiments, each of the conversations/messages in list 632 of the first area is excluded from list 642 of the second area. In some embodiments, no conversation/message in list 642 meets the predefined message importance criteria. As applied to lists of conversations, this means that no conversation in list 642 contains a message that meets the predefined message importance criteria.

As shown in FIG. 6B, in some embodiments, the message area of the message application's user interface further includes a third area for displaying a third set of messages. In most, if not all, embodiments, messages in the first set of messages and messages in the second set of messages are excluded from the third set of messages displayed in the third area. In this example, the third area includes a heading 644 (e.g., "Everything else") displayed at the top left corner of the third area. Below heading 644 is a list 650 of conversations or messages, each occupying one row in the third area. At the top right corner of the third area, there is a "View Inbox" link 646 (also called an expansion affordance) as described in greater detail below with reference to FIGS. 6C-6D. In some embodiments, the list 650 of conversations/messages is displayed in chronological order in the third area. In some embodiments, each of the conversations/messages in list 632 of the first area and list 642 of the second area is excluded from list 650 of the third area. In yet other embodiments, the user interface includes four distinct message areas (not shown), each for displaying a distinct set of conversations/messages. Optionally, the user can configure the user interface to determine the content of each message area. Optionally, the user can configure one of these areas to including only messages having a particular user-defined label (e.g., messages having the user-defined label "vacation"). Stated another say, the client device selects, for display in the respective area of the user interface, only messages (or conversations having at least one message) labeled with the particular user-defined label.

Though not shown, in some embodiments, each of the first, second and third areas in FIG. 6B includes a clickable drop-down header that allows a user to customize the way messages are displayed in a respective area and/or apply actions to all visible messages displayed in a respective area. In some embodiments, such a clickable drop-down header is attached to link "Important" 618, link "Starred" 636 and link "Everything Else" 644 respectively. The clickable drop-down header includes options that enable a user to customize the size of a respective area, the category of a respective area, etc. Optionally, the clickable drop-down header includes options that enable the user to select or deselect all visible messages in a respective area, or apply other actions to all visible messages in a respective area.

FIG. 6C is a schematic screenshot of a "Sorted Inbox" user interface of a messaging application, depicting how a user expands the first area of the messaging application user interface by selecting the "View All" link (also called an expansion affordance), according to some embodiments. If a user wants to view only the messages and conversations in list 632 of the first area, the user can click (652) on the "View All" link located at the top right corner of the first area to expand the first area. The user interface schematically depicted in FIG. 6C will then change to the user interface schematically depicted in FIG. 6D, which depicts the first area in its expanded state. As shown in FIG. 6D, after the user clicks on the "View All" link to expand the first area, only conversations/messages in list 632 are displayed in the message area of the display window. In some embodiments, list 632 includes more conversations/messages than the maximum number of messages that can be displayed in the first area in FIG. 6C, but after the user expands the first area by clicking on the "View All" link, additional conversations/messages from list 632 that are not displayed in the first area in FIG. 6C can be displayed in the message area in FIG. 6D. In analogous manner, the user can click on the "View Starred" link 638 (FIG. 6A) to expand the second area, or click on the "View Inbox" link 646 (FIG. 6B) to expand the third area.

Though not shown, in some embodiments, each of the first, second and third areas in FIG. 6B includes a collapse affordance 621, 639, 647 (also called an display area collapse link) that allows a user to collapse a respective display area of the user interface. In some embodiments, a respective collapse affordance is displayed above and near the left margin of the corresponding display area. When a user clicks on the collapse affordance of a respective area, the respective area is collapsed. In some embodiments, the respective area in its collapsed state only shows a header with the title of the respective area and a count of messages included in the respective area.

FIG. 6E is a schematic screenshot of a messaging application user interface, depicting how a user can mark an item displayed in the second area as important by selecting the item and clicking on the "Important" button (also called an importance marking affordance), according to some embodiments. If a user wants to mark a message or conversation in the second area (e.g., conversation 660 in FIG. 6E) as important, the user can select (670) the checkbox of conversation 660 and click (672) the button "Important." The screenshot in FIG. 6E will then change to the screenshot in FIG. 6F, where conversation 660 is moved from the second area to the first area and is included in the list 632 of the first area. Accordingly, in this example, conversation 662 is moved from the second message in list 642 (as shown in FIG. 6E) to the first message in list 642 (as shown in FIG. 6F).

Figure 7A:
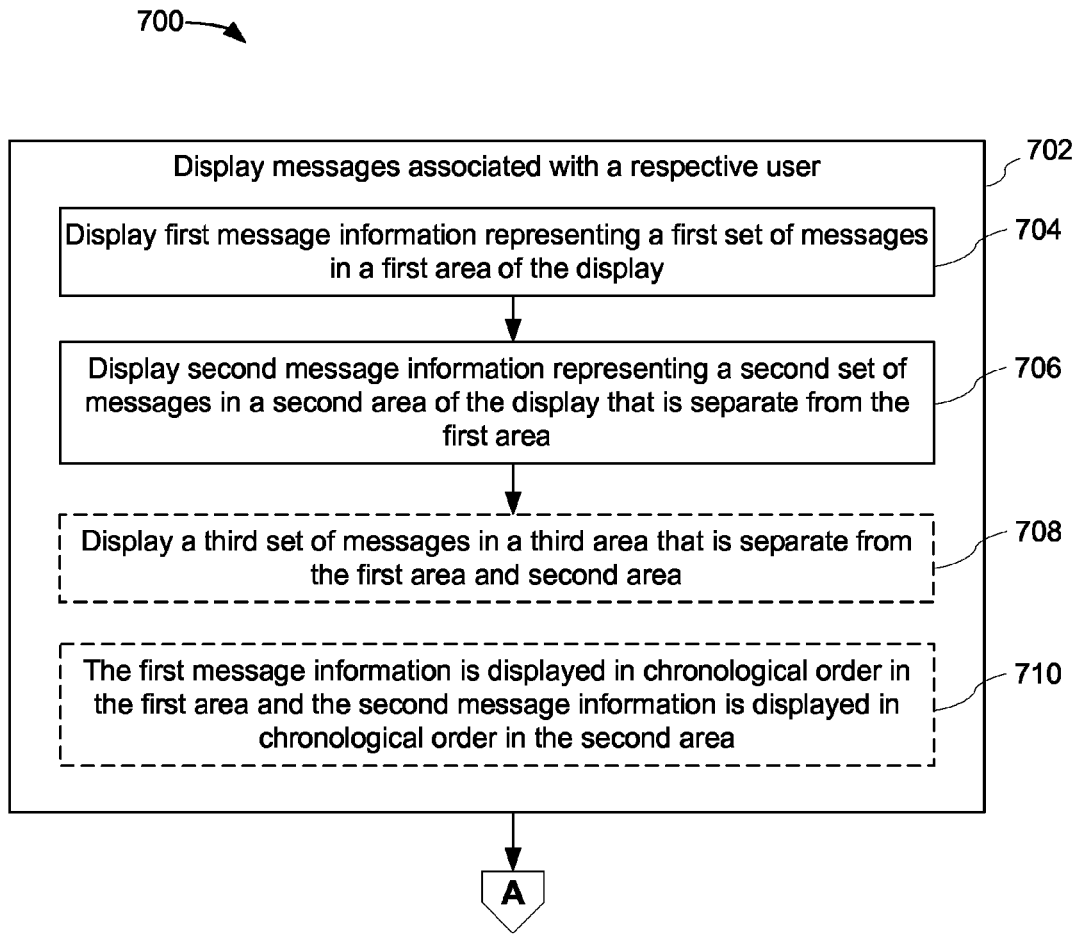
FIG. 7A is a flow chart representing a method for displaying messages associated with a respective user, according to some embodiments.

FIG. 7A is a flow chart representing a method 700 for displaying (702) messages associated with a respective user, according to some embodiments. A client system (e.g., client system 102, FIGS. 1A and 4) displays (704) first message information representing a first set of messages in a first area of the display and displays (706) second message information representing a second set of messages in a second area of the display that is separate from the first area (see, for example, the areas occupied by lists 632 and 642, FIG. 6A). In some embodiments, client system 102 further displays (708) a third set of messages in a third area that is separate from the first and second areas (see, for example, the areas occupied by lists 632, 642 and 650, FIG. 6B). In some embodiments, both the first message information and the second message information are displayed (710) by client system 102 in chronological order in their respective display areas. Details of method 700 are described above with reference to FIGS. 6A-6F.

Figure 7B:
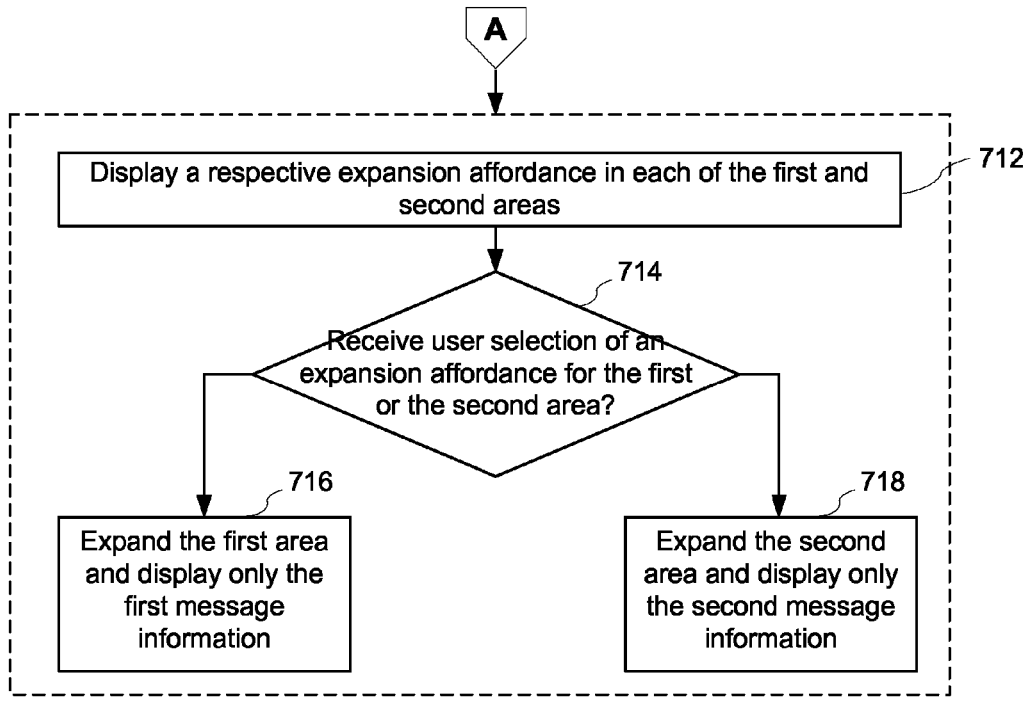
FIG. 7B is a flow chart illustrating the operation of an expansion affordance, according to some embodiments.

FIG. 7B is a flow chart illustrating the operation of an expansion affordance, according to some embodiments. Client system 102 system displays (712) a respective expansion affordance (e.g., 620, 638, FIG. 6A) in each of the first and second areas. In some embodiments, client system 102 receives (714) a user selection of the expansion affordance for the first area, and expands (716) the first area and displays only the first message information. In another embodiment, client system 102 receives (714) a user selection of the expansion affordance for the second area, and expands (718) the second area and displays only the second message information. Details of the method are described above with reference to FIGS. 6C-6D.

Figure 7C:
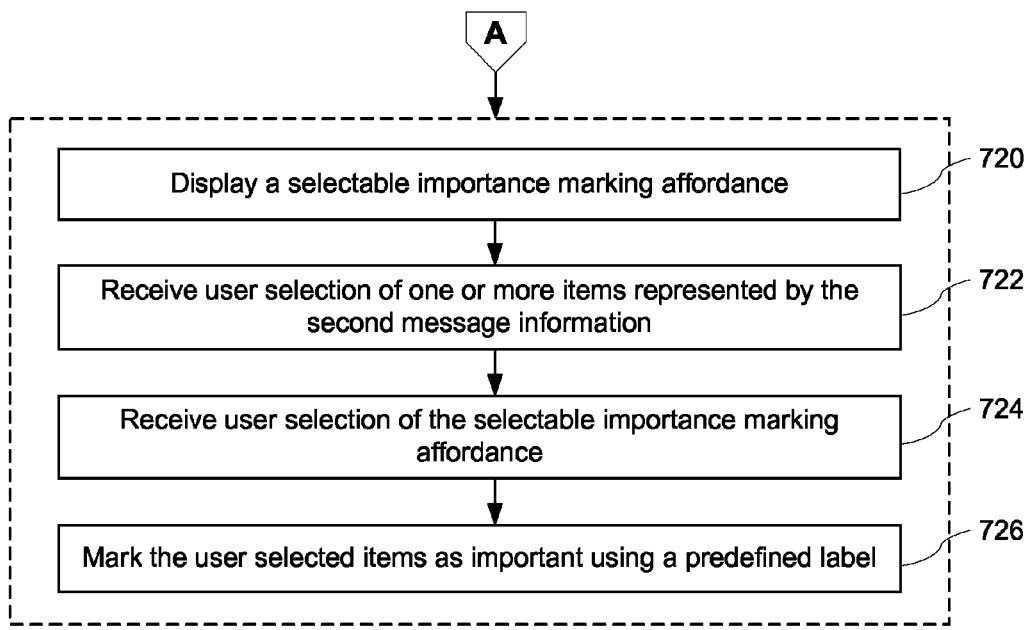
FIG. 7C is a flow chart illustrating the operation of an importance marking affordance, according to some embodiments.

FIG. 7C is a flow chart illustrating the operation of an importance marking affordance, according to some embodiments. The system displays (720) a selectable importance marking affordance. For example, FIG. 6A shows two selectable importance marking affordances, the Important 608 and Not Important 610 marking affordances. In some embodiments, the system receives (722) a user selection of one or more items represented by the second message information and receives (724) a user selection of the selectable importance marking affordance. The system then marks (726) the user selected items as important using a predefined label. Details of the method are described above with reference to FIGS. 6E-6F. The user action of marking selected items as important, or as not important, provides user-generated feedback data regarding importance of one or more user-selected messages. Optionally, the server (106, FIG. 2) collects feedback data from the user regarding importance of one or more messages, and modifies the second importance prediction model using the feedback data. Optionally, the server periodically (or from time to time) updates one or more of the importance weights in the first and second importance prediction models using machine-learning that is based, at least in part, on the feedback data. Optionally, the server updates one or more of the importance weights in the first and second importance prediction models using a time-dependent decay function that is applied to the feedback data and optionally to information concerning other user actions on messages. Optionally, the server also updates one or more importance thresholds based, at least in part, on the feedback data, so as to adjust the volume of conversations/messages classified as important and displayed in the message display area (e.g., see FIG. 6A) for important conversations/messages.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a server system having one or more processors and memory storing one or more programs in the memory to be executed by the one or more processors, the one or more programs including instructions for:
receiving a message associated with a user;
extracting message signals from the message, the extracted message signals including a first plurality of message signals;
generating an importance weight for each message signal of the first plurality of message signals, the generating including, for a respective message signal:
determining a first weight for the respective message signal using a first importance prediction model;
determining a second weight for the respective message signal using a second importance prediction model;
determining the importance weight of the respective message signal by combining the first weight and the second weight;
wherein the first importance prediction model is based on information associated with multiple users, and the second importance prediction model is based on information associated with the user; and
determining an importance score for the message based on the generated importance weights of the first plurality of message signals;
sending the message along with information regarding importance of the message to the user for display at a client device, wherein the information regarding importance of the message is based at least on the determined importance score.

2. The method of claim 1,
wherein the extracted message signals comprises the first plurality of message signals and a second plurality of message signals;
the method further comprising:
generating an importance weight for each message signal of the second plurality of message signals using the second importance prediction model; and
determining the importance score for the message based on the generated importance weights of the first plurality of message signals and the generated importance weights of the second plurality of message signals.

3. The method of claim 1, further including comparing the importance score of the message with a threshold to determine importance of the message.

4. The method of claim 3, further including periodically updating the threshold using machine learning.

5. The method of claim 1, further comprising collecting feedback data from the user regarding importance of the message, and modifying the second importance prediction model using the feedback data.

6. The method of claim 1, wherein combining the first weight and the second weight comprises adding the first weight and the second weight.

7. The method of claim 1, wherein the first importance prediction model and second importance prediction model both include a plurality of term-related weights, each for a distinct term-related message signal corresponding to presence or quantity of important terms in the message, wherein important terms comprise terms determined to be indicative of message importance.

8. The method of claim 1, wherein
the message includes information identifying a set of message participants,
the user has an associated social graph having a set of social graph members; and
the first importance prediction model and second importance prediction model both include a plurality of social graph-related weights, each concerning at least one of: presence of social graph members in the message participants, interactions of one or more social graph members with the message, interactions of one or more social graph members with information having a predefined relationship to the message.

9. The method of claim 1, further including updating one or more of the importance weights in the first importance prediction model and second importance prediction model using a time-dependent decay function.

10. The method of claim 1, further including automatically generating the importance weights for both the first importance prediction model and the second importance prediction model without collecting feedback data from the user regarding importance of any messages.

11. The method of claim 1, further including automatically generating the importance weights for both the first importance prediction model and the second importance prediction model without requiring the user to provide feedback data regarding importance of any messages.

12. The method of claim 1, further including automatically generating the importance weights for the first importance prediction model while excluding user provided message importance feedback, if any; and automatically generating the importance weights for the second importance prediction model while incorporating optional user provided message importance feedback, if any.

13. The method of claim 1, further including periodically updating one or more of the importance weights in the first and second importance prediction model using machine learning.

14. The method of claim 1, wherein the first plurality of message signals include one or more combination message signals, wherein the combination message signals are combination of two or more message signals.

15. A server system, comprising:
one or more processors;
memory storing one or more programs for execution by the one or more processors, the one or more programs including instructions for:
receiving a message associated with a user;
extracting message signals from the message, the extracted message signals including a first plurality of message signals;
generating an importance weight for each message signal of the first plurality of message signals, the generating including, for a respective message signal:
determining a first weight for the respective message signal using a first importance prediction model;
determining a second weight for the respective message signal using a second importance prediction model;
determining the importance weight of the respective message signal by combining the first weight and the second weight;
wherein the first importance prediction model is based on information associated with multiple users, and the second importance prediction model is based on information associated with the user; and
determining an importance score for the message based on the generated importance weights of the first plurality of message signals;
sending message information for the message, comprising the message or information identifying the message, along with information regarding importance of the message to the user for display at a client device, wherein the information regarding importance of the message is based at least on the determined importance score.

16. The server system of claim 15,
wherein the extracted message signals comprises the first plurality of message signals and a second plurality of message signals;
the one or more programs further comprising instructions for:
generating an importance weight for each message signal of the second plurality of message signals using the second importance prediction model; and
determining the importance score for the message based on the generated importance weights of the first plurality of message signals and the generated importance weights of the second plurality of message signals.

17. The server system of claim 15, the one or more programs further comprising instructions for comparing the importance score of the message with a threshold to determine importance of the message.

18. The server system of claim 15, wherein
the message includes information identifying a set of message participants,
the user has an associated social graph having a set of social graph members; and
the first importance prediction model and second importance prediction model both include a plurality of social graph-related weights, each concerning at least one of: presence of social graph members in the message participants, interactions of one or more social graph members with the message, interactions of one or more social graph members with information having a predefined relationship to the message.

19. A non-transitory computer readable storage medium storing one or more programs for execution by the one or more processors of a server system, the one or more programs including instructions for:
receiving a message associated with a user;

extracting message signals from the message, the extracted message signals including a first plurality of message signals;

generating an importance weight for each message signal of the first plurality of message signals, the generating including, for a respective message signal:
- determining a first weight for the respective message signal using a first importance prediction model;
- determining a second weight for the respective message signal using a second importance prediction model;
- determining the importance weight of the respective message signal by combining the first weight and the second weight;
- wherein the first importance prediction model is based on information associated with multiple users, and the second importance prediction model is based on information associated with the user; and determining an importance score for the message based on the generated importance weights of the first plurality of message signals;

sending the message along with information regarding importance of the message to the user for display at a client device, wherein the information regarding importance of the message is based at least on the determined importance score.

20. The non-transitory computer readable storage medium of claim 19,
wherein the extracted message signals comprises the first plurality of message signals and a second plurality of message signals;
the one or more programs further comprising instructions for:
- generating an importance weight for each message signal of the second plurality of message signals using the second importance prediction model; and
- determining the importance score for the message based on the generated importance weights of the first plurality of message signals and the generated importance weights of the second plurality of message signals.

21. The non-transitory computer readable storage medium of claim 19, the one or more programs further comprising instructions for comparing the importance score of the message with a threshold to determine importance of the message.

22. The non-transitory computer readable storage medium of claim 19, wherein
the message includes information identifying a set of message participants,
the user has an associated social graph having a set of social graph members; and
the first importance prediction model and second importance prediction model both include a plurality of social graph-related weights, each concerning at least one of: presence of social graph members in the message participants, interactions of one or more social graph members with the message, interactions of one or more social graph members with information having a predefined relationship to the message.

\* \* \* \* \*

UNITED STATES PATENT AND TRADEMARK OFFICE
CERTIFICATE OF CORRECTION

PATENT NO. : 8,700,545 B2  
APPLICATION NO. : 13/219646  
DATED : April 15, 2014  
INVENTOR(S) : Aberdeen et al.

Page 1 of 1

It is certified that error appears in the above-identified patent and that said Letters Patent is hereby corrected as shown below:

In the Title Page, item (60) Related U.S. Application Data, line 2, please delete "61/337,793" and insert --61/377,793--

Signed and Sealed this
Fifteenth Day of July, 2014

Michelle K. Lee
*Deputy Director of the United States Patent and Trademark Office*